United States Patent
Yonemura

(10) Patent No.: US 11,333,542 B2
(45) Date of Patent: May 17, 2022

(54) PHYSICAL QUANTITY DETECTION DEVICE AND PRINTING APPARATUS

(71) Applicant: SEIKO EPSON CORPORATION, Tokyo (JP)

(72) Inventor: Takayuki Yonemura, Nagano (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/038,389

(22) Filed: Sep. 30, 2020

(65) Prior Publication Data

US 2021/0096016 A1 Apr. 1, 2021

(30) Foreign Application Priority Data

Sep. 30, 2019 (JP) .............................. JP2019-178873

(51) Int. Cl.
*G01F 23/26* (2022.01)
*G01F 23/263* (2022.01)
*B01L 3/00* (2006.01)

(52) U.S. Cl.
CPC .............. *G01F 23/265* (2013.01); *B01L 3/52* (2013.01); *G01F 23/268* (2013.01); *B01L 2300/0645* (2013.01)

(58) Field of Classification Search
CPC ......... B01L 2200/143; B01L 2300/027; B01L 2300/0645; B01L 3/0268; B01L 3/52; G01F 23/263; G01F 23/265; G01F 23/266; G01F 23/268
See application file for complete search history.

(56) References Cited

U.S. PATENT DOCUMENTS

| | | | | |
|---|---|---|---|---|
| 5,682,184 | A * | 10/1997 | Stephany | B41J 2/17566 347/7 |
| 6,918,296 | B1 * | 7/2005 | Urquidi | G01F 23/268 73/304 R |
| 9,903,748 | B1 | 2/2018 | Lo | |
| 10,107,668 | B2 | 10/2018 | Dulaff | |
| 10,288,467 | B2 | 5/2019 | Shibata et al. | |
| 2008/0069576 | A1 * | 3/2008 | Etter | G03G 15/086 399/35 |
| 2008/0231290 | A1 * | 9/2008 | Zhitomirsky | G01F 23/265 324/661 |
| 2011/0162448 | A1 * | 7/2011 | McGaughey | G01F 23/268 73/304 C |

(Continued)

FOREIGN PATENT DOCUMENTS

| | | |
|---|---|---|
| JP | 2001121681 A | 5/2001 |
| JP | 6286214 B2 | 2/2018 |

*Primary Examiner* — Francis C Gray
(74) *Attorney, Agent, or Firm* — Chip Law Group

(57) ABSTRACT

A physical quantity detection device including a container that is formed with an accommodation space accommodating a detection object formed of a dielectric, a first electrode and at least one second electrode that face with each other via the accommodation space, and an electrostatic capacitance detector that detects an electrostatic capacitance between the first electrode and the second electrode by applying an alternating current voltage between the first electrode and the second electrode. A frequency of the alternating current voltage applied between the first electrode and the second electrode is 1 kHz or higher.

14 Claims, 13 Drawing Sheets

(56) References Cited

U.S. PATENT DOCUMENTS

| | | | |
|---|---|---|---|
| 2013/0068015 A1* | 3/2013 | Sinha | G01F 23/268 |
| | | | 73/304 C |
| 2017/0138901 A1* | 5/2017 | Norton | B01L 3/502792 |
| 2019/0227020 A1* | 7/2019 | Tamida | G01F 23/266 |
| 2020/0141789 A1* | 5/2020 | Schneider | G01F 23/266 |
| 2021/0123785 A1* | 4/2021 | Liniger | G01F 23/242 |

* cited by examiner

US 11,333,542 B2

PHYSICAL QUANTITY DETECTION DEVICE AND PRINTING APPARATUS

The present application is based on, and claims priority from JP Application Serial Number 2019-178873, filed Sep. 30, 2019, the disclosure of which is hereby incorporated by reference herein in its entirety.

BACKGROUND

1. Technical Field

The present disclosure relates to a physical quantity detection device and a printing apparatus.

2. Related Art

JP-A-2001-121681 (Patent Literature 1) discloses a technique known as a remaining amount detection unit that detects a remaining amount of ink inside an ink container in a printing apparatus or the like. The remaining amount detection unit disclosed in Patent Literature 1 includes the ink container that contains ink, a pair of electrodes that is provided to face each other via the ink container, and an electric capacitance detection unit that detects an electric signal according to an electrostatic capacitance value between the pair of electrodes. Each electrode has an elongated shape extending in a vertical direction. A part where the electrodes overlap each other as viewed from a direction in which the electrodes face each other is an effective region functioning as a capacitor.

Electrostatic capacitance values detected by the electric capacitance detection unit are different when ink is present between the electrodes and when no ink is present between the electrodes due to decreasing of ink from a state in which ink is present between the electrodes. This is because a dielectric constant of ink and a dielectric constant of air are different. The printing apparatus disclosed in Patent Literature 1 detects a remaining amount of ink based on a change in the electrostatic capacitance values.

However, in the remaining amount detection unit disclosed in Patent Literature 1, after a remaining amount of ink decreases, a state in which ink adheres to an inner wall of the container may be continued for a relatively long period depending on various conditions such as a type of ink. An electrostatic capacitance value may not be detected accurately due to adhesion of ink. As a result, the remaining amount detection unit disclosed in Patent Literature 1 cannot accurately and quickly detect a remaining amount of ink.

SUMMARY

The present disclosure is made to solve at least a part of problems described above, and can be implemented as follows.

A physical quantity detection device according to an application example includes a container that is internally formed with an accommodation space accommodating a detection object formed of a dielectric, a first electrode and at least one second electrode that face each other via the accommodation space, and an electrostatic capacitance detector that detects an electrostatic capacitance between the first electrode and the second electrode by applying an alternating current voltage between the first electrode and the second electrode. A frequency of the alternating current voltage applied between the first electrode and the second electrode is 1 kHz or higher.

DESCRIPTION OF EXEMPLARY EMBODIMENTS

Hereinafter, a physical quantity detection device and a printing apparatus according to the present disclosure will be described in detail based on preferred embodiments shown in accompanying drawings.

First Embodiment

Figure 1:
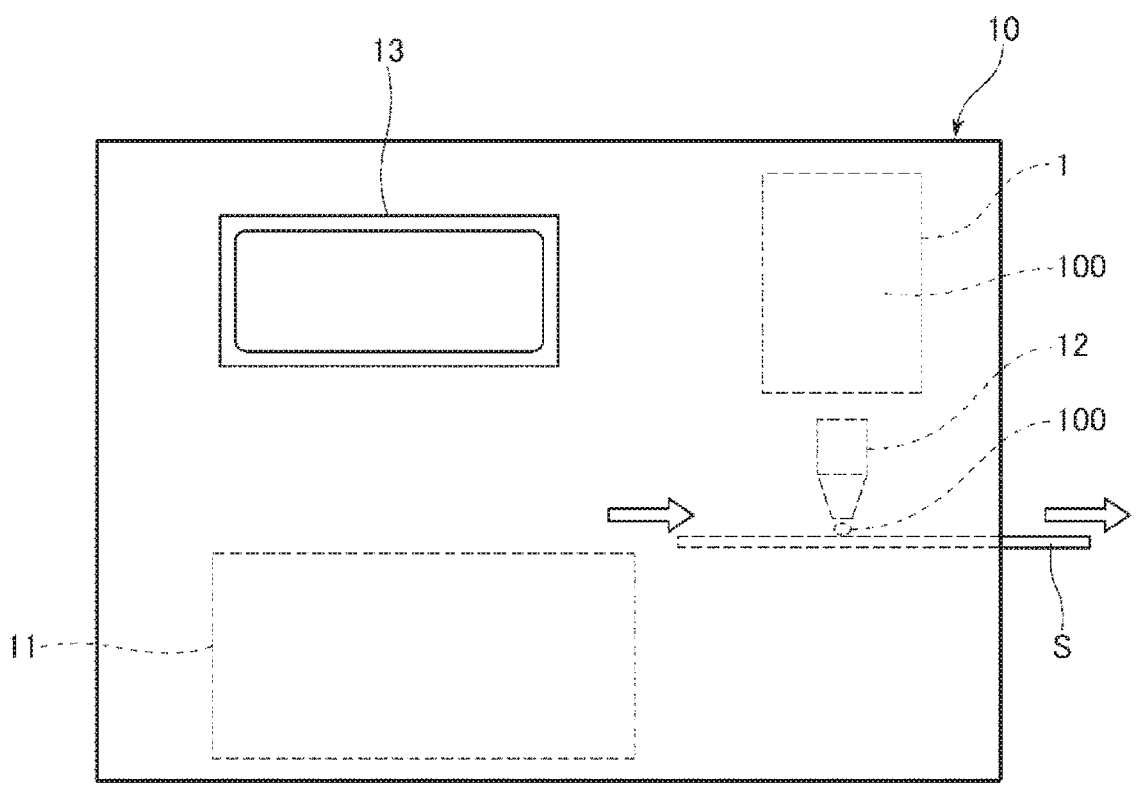
FIG. 1 is a schematic configuration diagram showing a printing apparatus according to the present disclosure.
Figure 2:
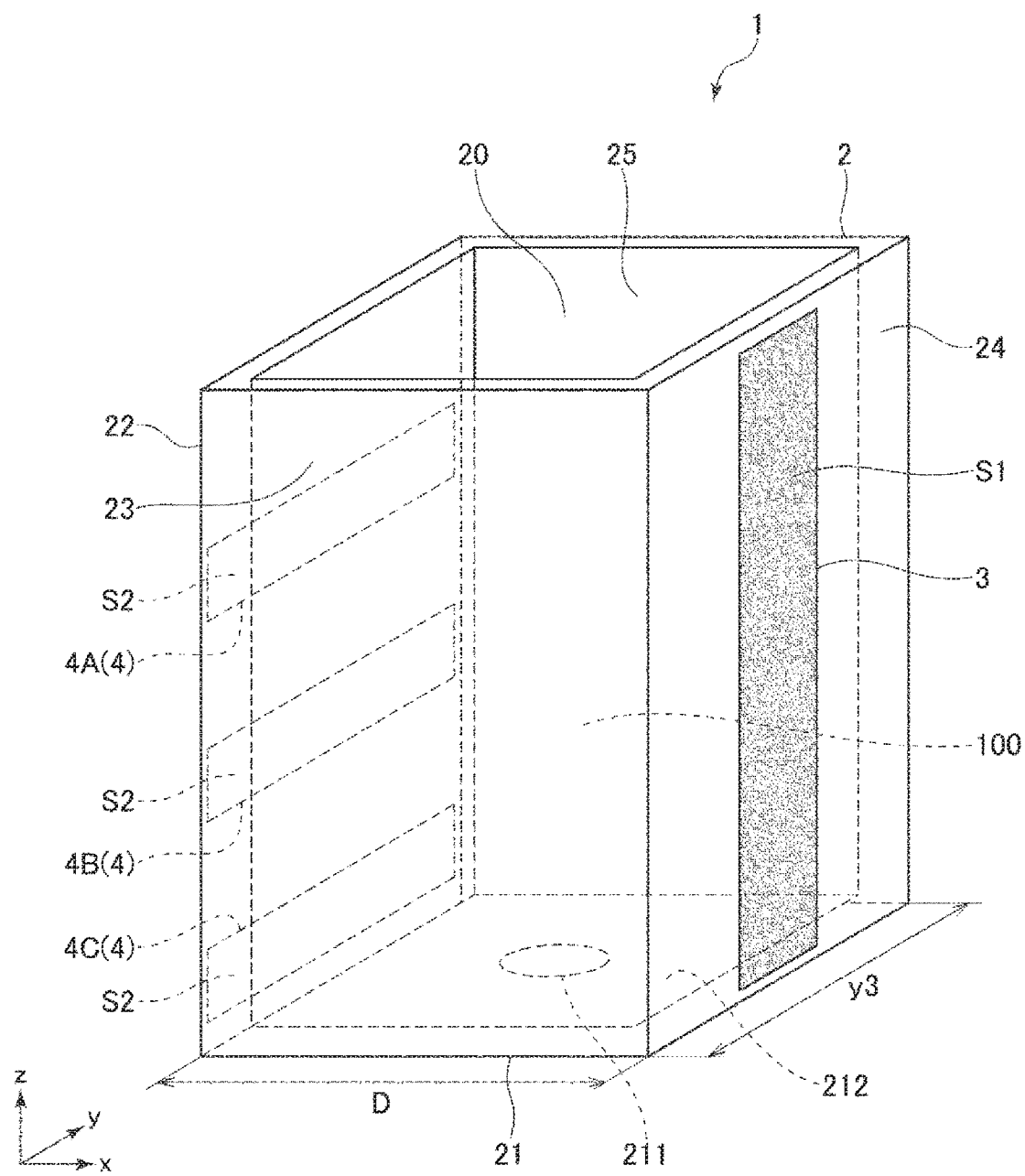
FIG. 2 is a perspective view showing a container provided in a physical quantity detection device shown in FIG. 1.
Figure 3:
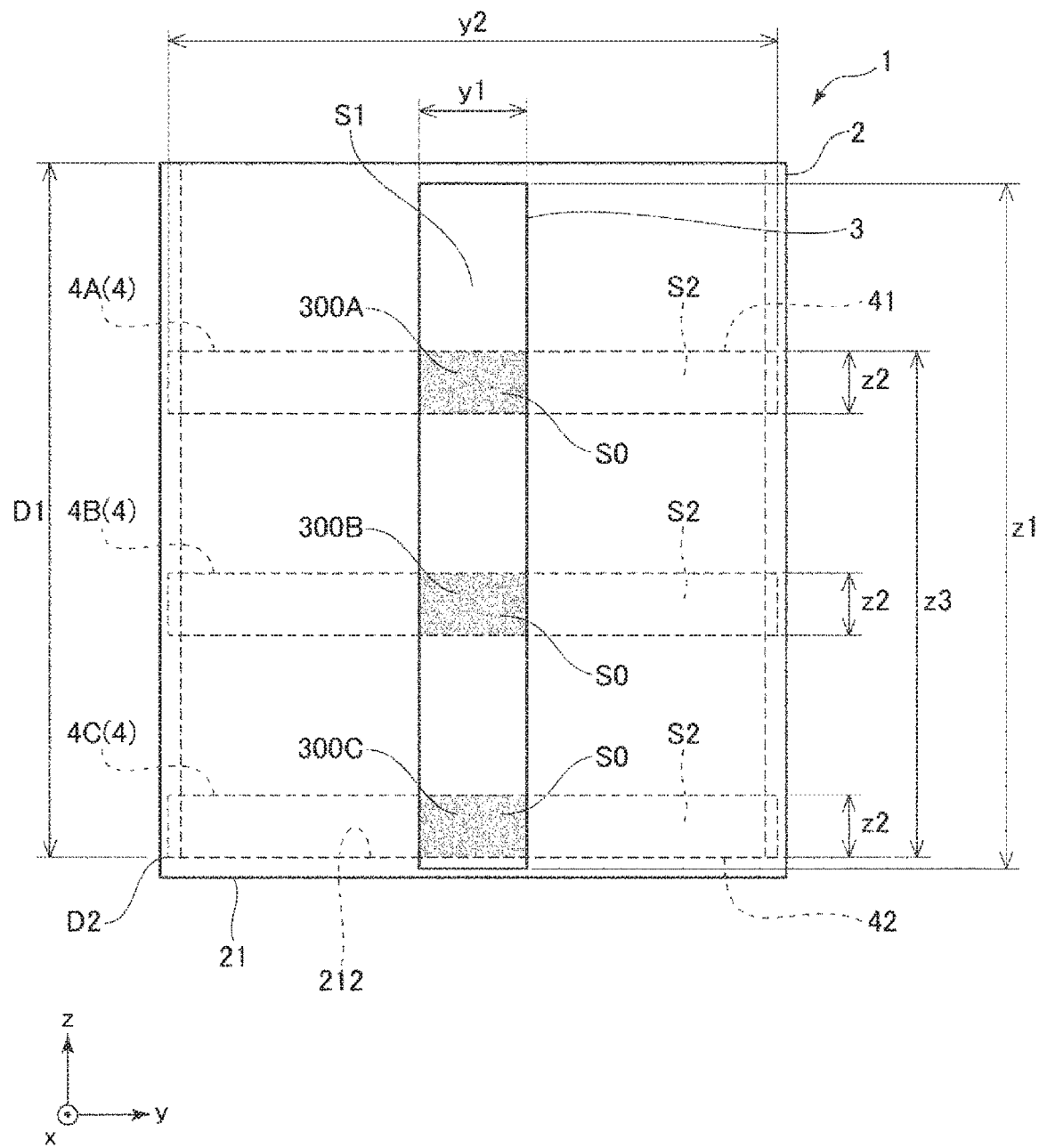
FIG. 3 is a diagram viewed from an x axis direction in FIG. 2.
Figure 4:
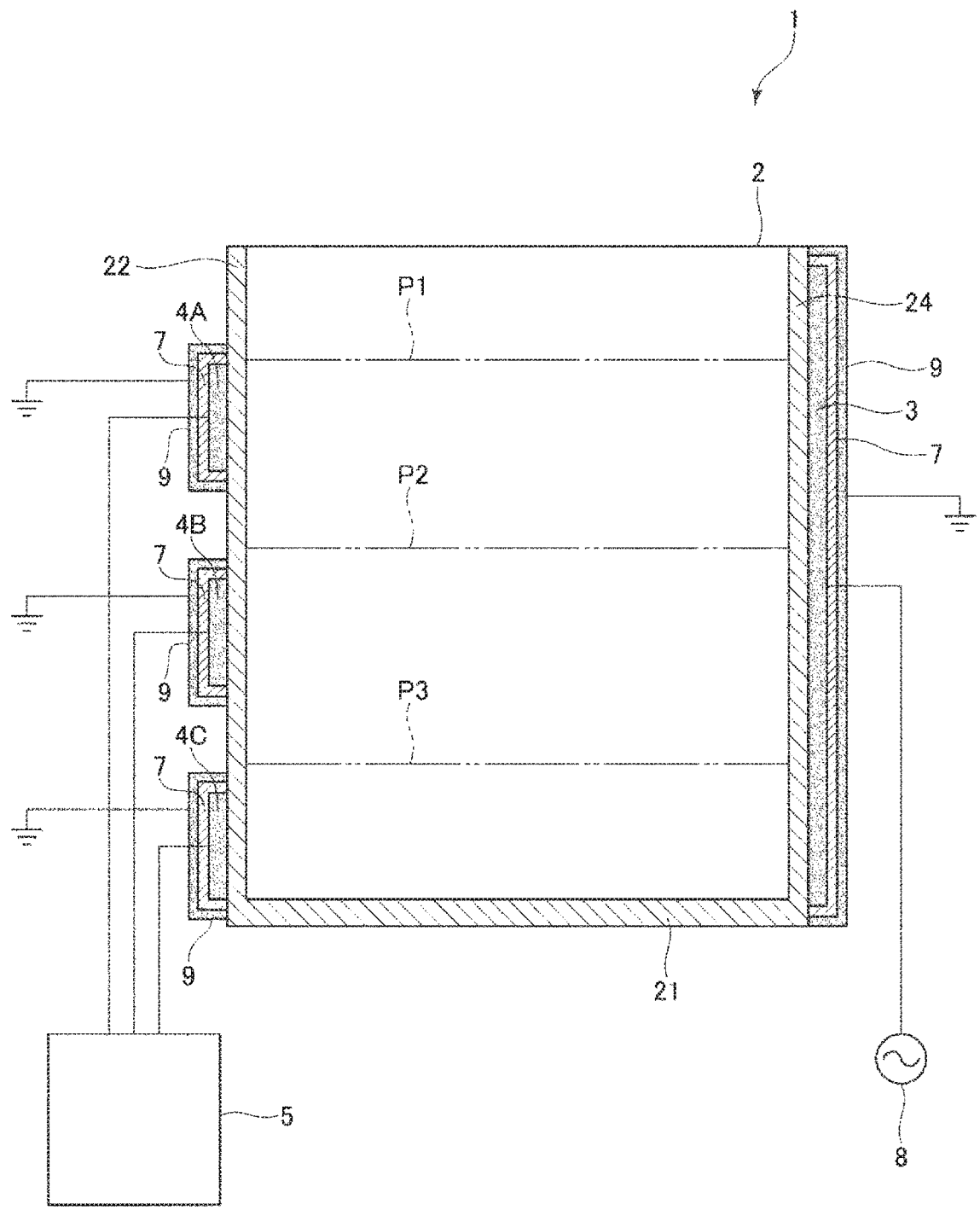
FIG. 4 is a diagram showing an electrical coupling with an electrostatic capacitance detector as viewed from a y axis direction in FIG. 2.
Figure 5:
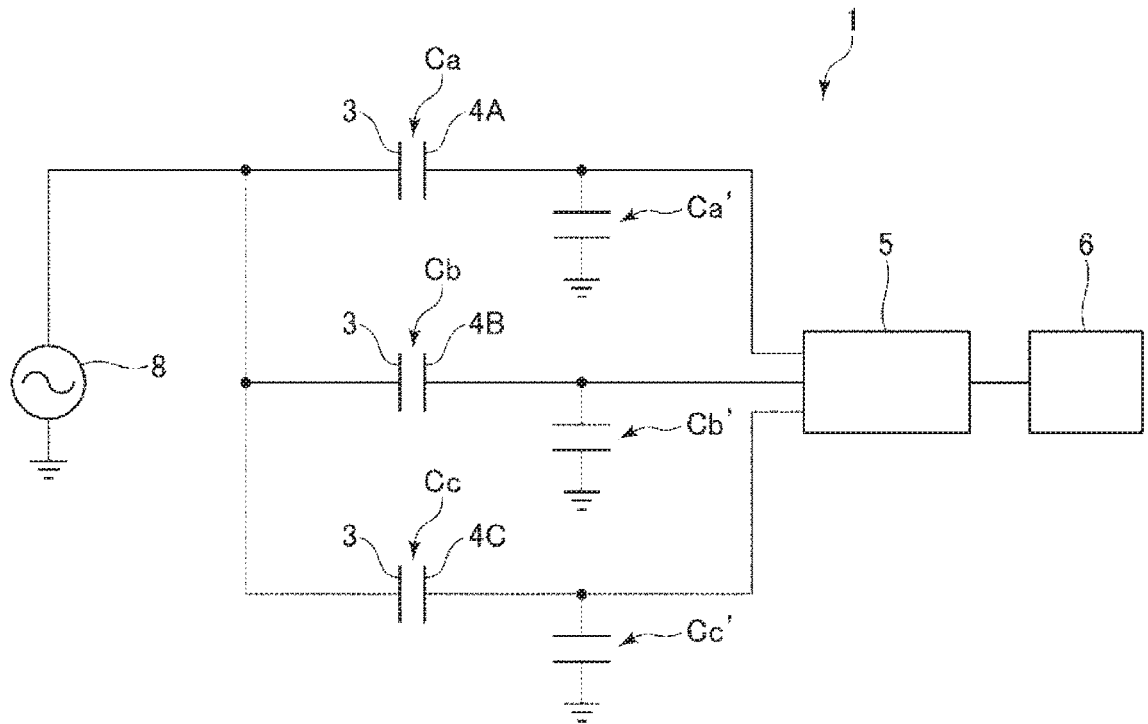
FIG. 5 is a circuit diagram showing the physical quantity detection device shown in FIG. 1.
Figure 6:
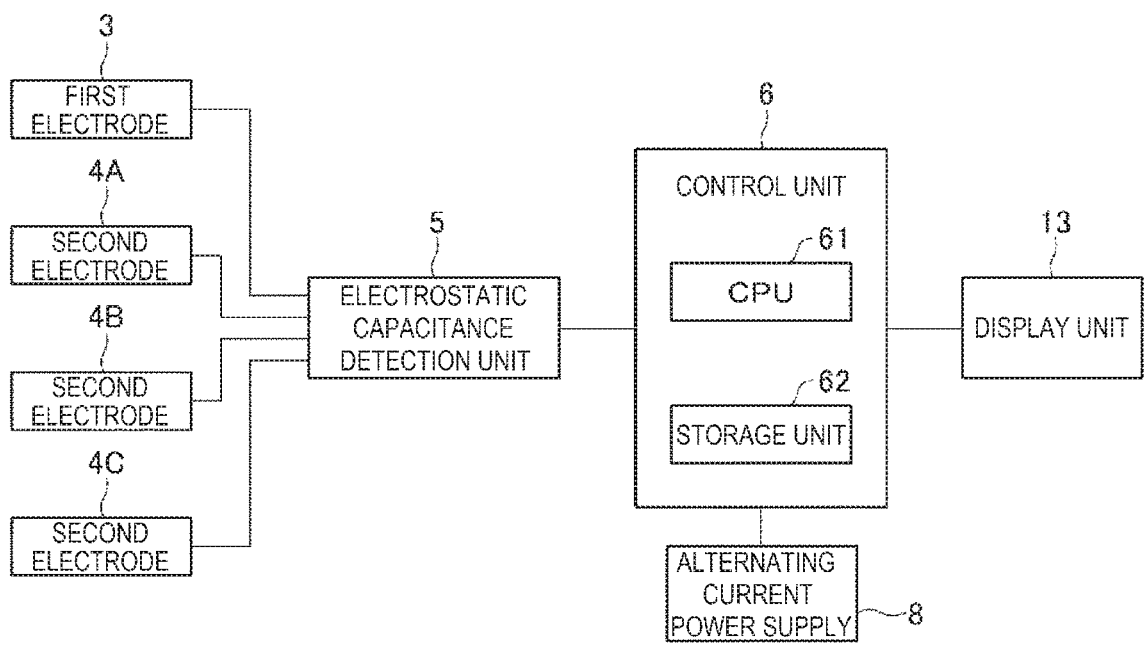
FIG. 6 is a block diagram showing the physical quantity detection device shown in FIG. 1.
Figure 11:
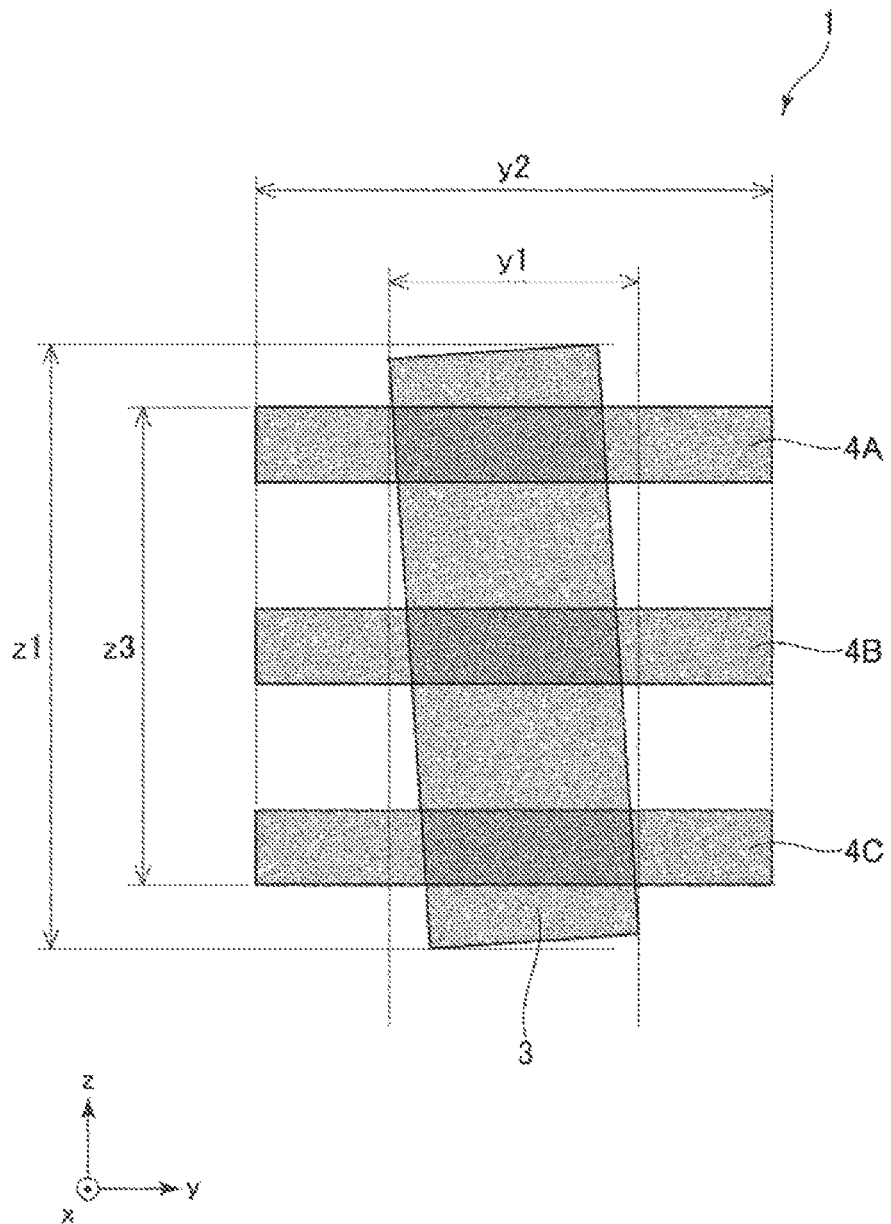
FIG. 11 is a diagram showing a positional relationship between a first electrode and a second electrode.
Figure 12:
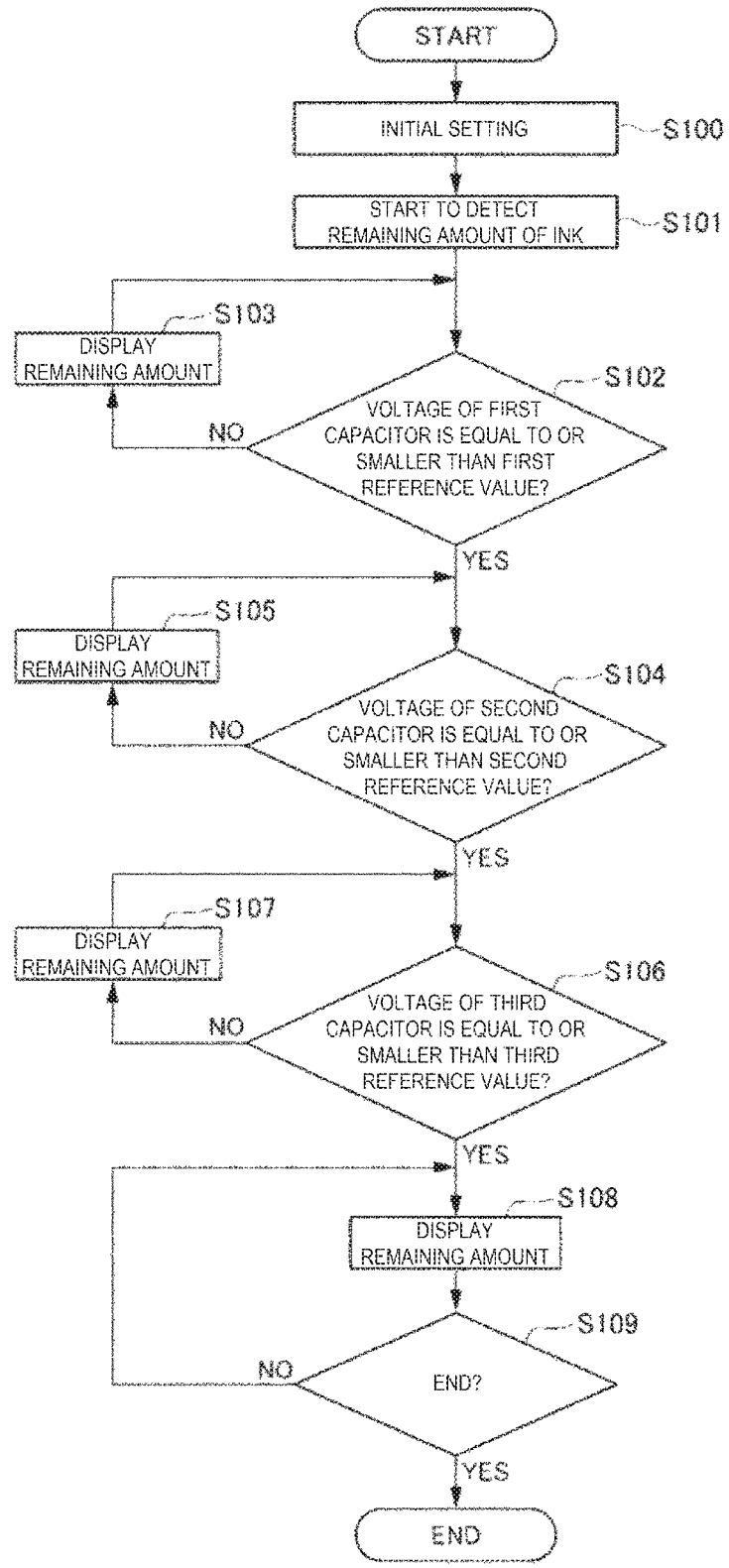
FIG. 12 is a flowchart showing a control operation performed by a control unit shown in FIG. 6.
Figure 13:
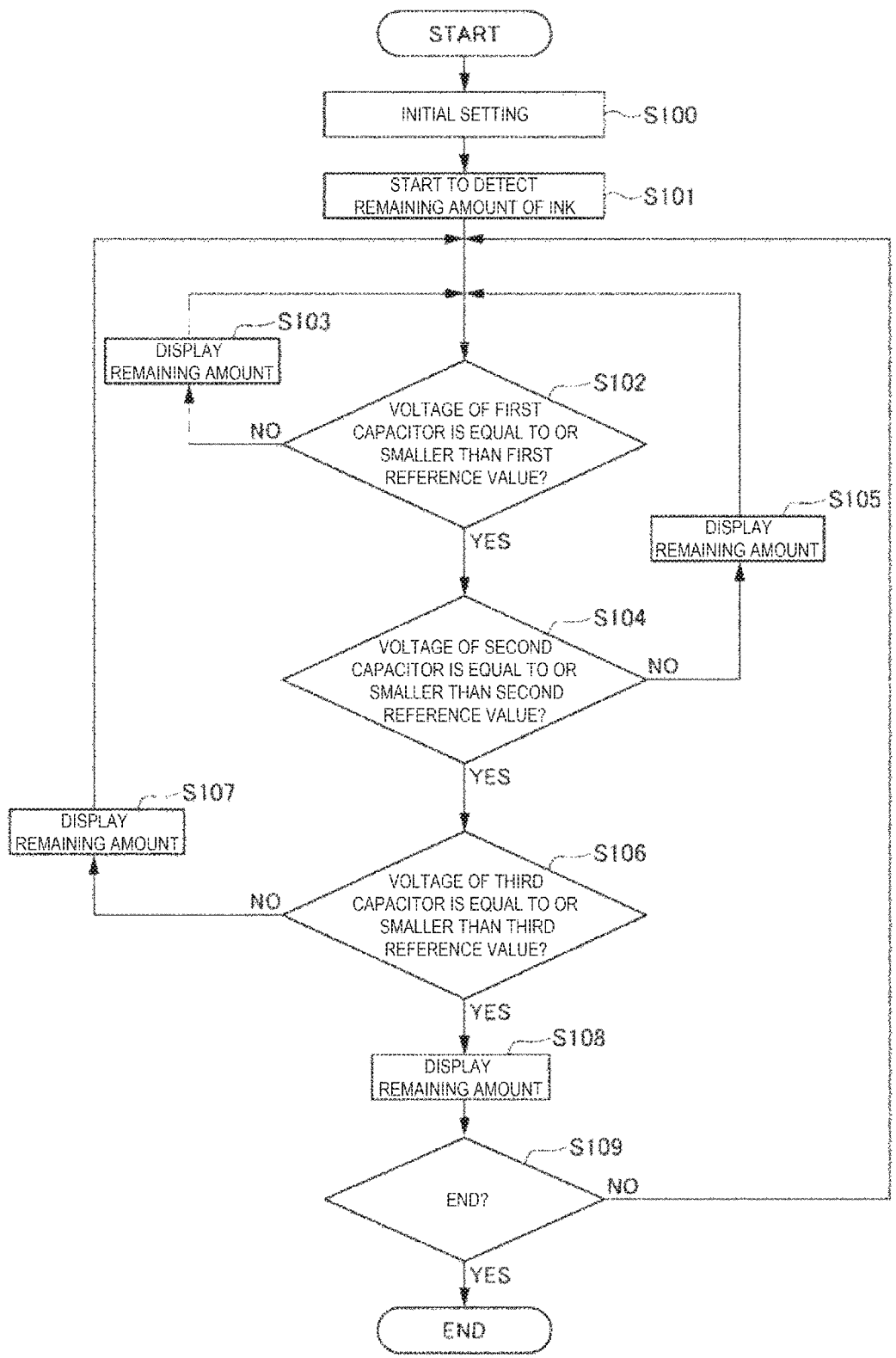
FIG. 13 is a flowchart showing a control operation performed by the control unit shown in FIG. 6.
Figure 14:
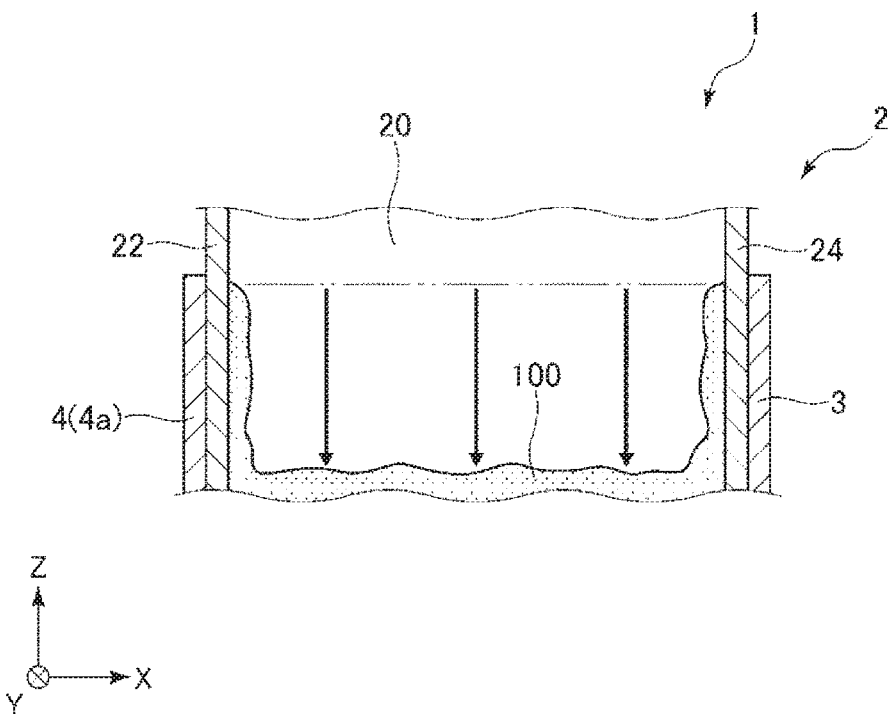
FIG. 14 is a cross-sectional view showing a state in which a remaining amount of a detection object in the container decreases.
Figure 15:
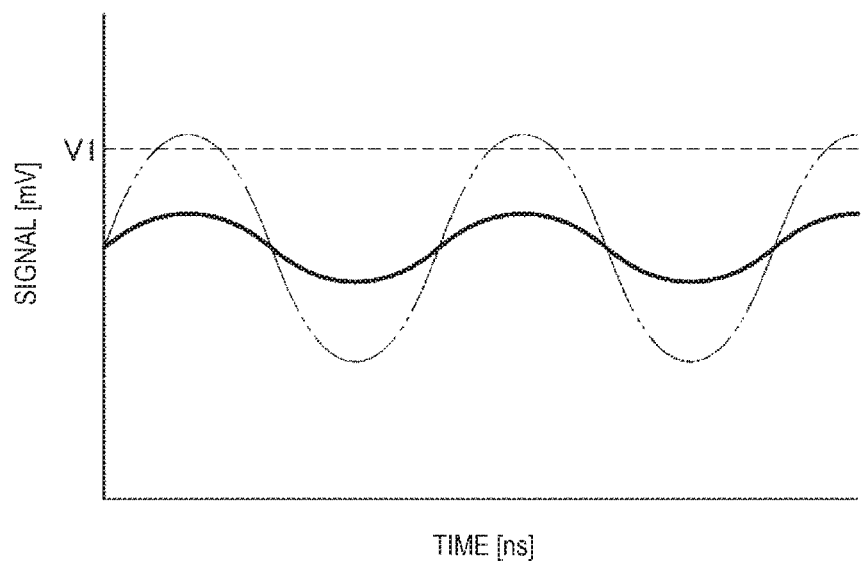
FIG. 15 is a graph showing a temporal change of voltages detected by the electrostatic capacitance detector.
Figure 16:
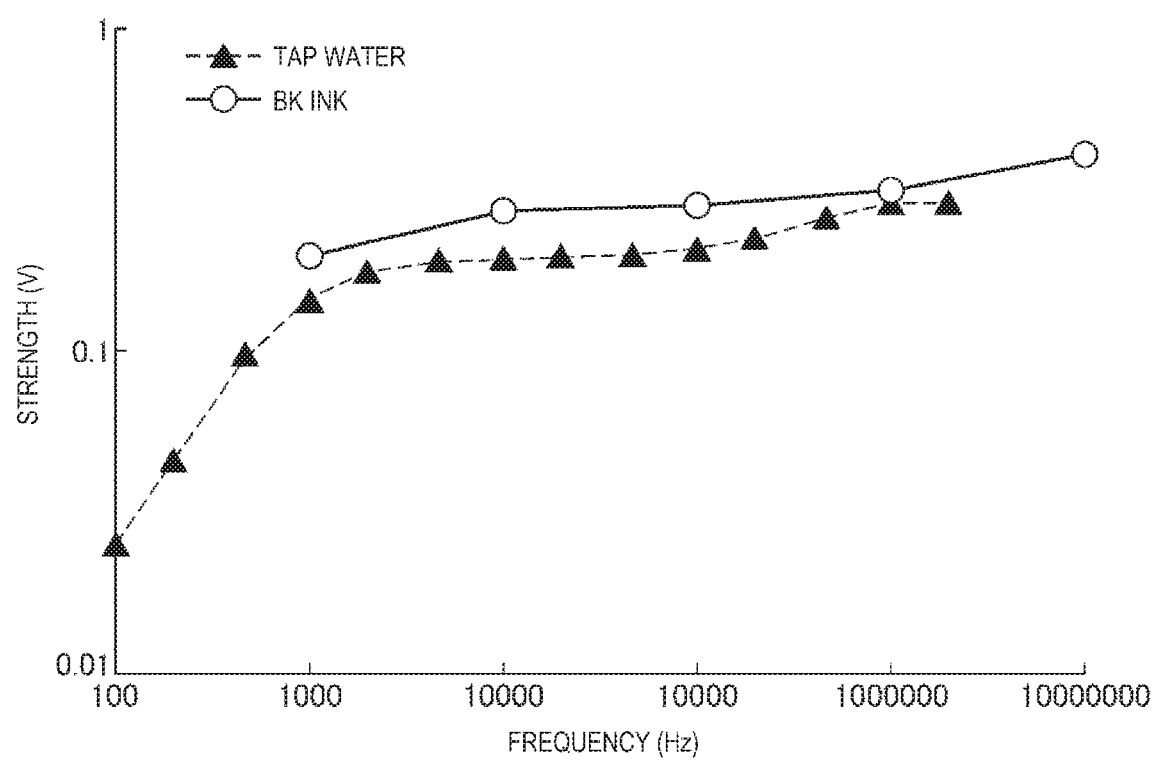
FIG. 16 is a graph showing a relationship between a frequency of an alternating current voltage applied to the first electrode and the second electrode and a voltage detected by the electrostatic capacitance detector.
Figure 17:
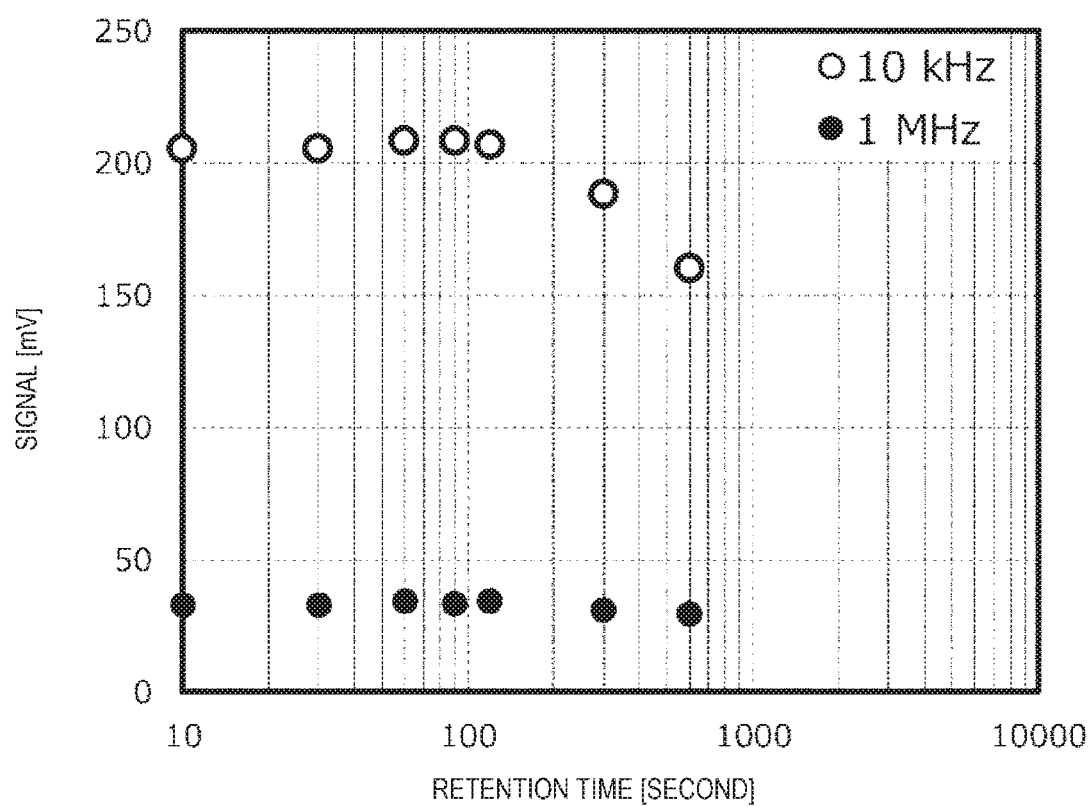
FIG. 17 is a graph showing a temporal change of voltages detected by the electrostatic capacitance detector.

FIG. 1 is a schematic configuration diagram showing a printing apparatus according to the present disclosure. FIG. 2 is a perspective view showing a container provided in a physical quantity detection device shown in FIG. 1. FIG. 3 is a diagram viewed from an x axis direction in FIG. 2. FIG. 4 is a diagram showing an electrical coupling with an electrostatic capacitance detector as viewed from a y axis direction in FIG. 2. FIG. 5 is a circuit diagram showing the physical quantity detection device shown in FIG. 1. FIG. 6 is a block diagram showing the physical quantity detection device shown in FIG. 1. FIGS. 7 to 10 are graphs each showing a temporal change of voltages detected by the electrostatic capacitance detector. FIG. 11 is a diagram showing a positional relationship between a first electrode and a second electrode. FIGS. 12 and 13 are flowcharts showing control operations performed by a control unit shown in FIG. 6. FIG. 14 is a cross-sectional view showing a state in which a remaining amount of a detection object in the container decreases. FIG. 15 is a graph showing a temporal change of voltages detected by the electrostatic capacitance detector. FIG. 16 is a graph showing a relationship between a frequency of an alternating current voltage applied to the first electrode and the second electrode and a voltage detected by the electrostatic capacitance detector. FIG. 17 is a graph showing a temporal change of voltages detected by the electrostatic capacitance detector.

In FIGS. 2 to 4, 11, and 14, an x axis, a y axis, and a z axis are set as three axes orthogonal to one another for convenience of description, and hereinafter the disclosure will be described based on the three axes. Hereinafter, a direction parallel to the x axis is referred to as an "x axis direction", a direction parallel to the y axis is referred to as a "y axis direction", and a direction parallel to the z axis is referred to as a "z axis direction".

In FIGS. 2 to 4 and 11, the z axis direction, that is, an upper-lower direction is referred to as a "vertical direction", the x axis direction and the y axis direction, that is, a left-right direction is referred to as a "horizontal direction", and an x-y plane is referred to as a "horizontal plane".

Hereinafter, a front end side of an arrow showing in the drawings is referred to as a "+ (plus)" or "positive" side, and a base end side is referred to as a "− (minus)" or "negative" side. For convenience of description, a +z axis direction in FIGS. 2 to 4 and 11, that is, an upper side is also referred to as "upper" or an "upper side" and a −z axis direction, that is, a lower side is also referred to as "lower" or a "lower side".

A physical quantity detection device 1 shown in FIG. 1 detects a remaining amount of a detection object formed of a dielectric. The detection object is not particularly limited as long as the detection object is formed of a dielectric. Examples of the detection object include various kinds of liquids such as ink, liquid medicine, mercury, oil, gasoline, drinking water, and other kinds of water and various kinds of powders or granules such as toner, sand, cement, chemical medicine, flour, salt, and sugar. The liquids and powders or granules have flowability.

The detection object may not have flowability. Examples of the detection object having no flowability include paper, various sheet materials, and the like.

In the present specification, a dielectric refers to a substance having an insulation property. In addition, the dielectric refers to a substance having a larger relative dielectric constant than air, that is, a relative dielectric constant larger than 1.

Hereinafter, an example will be described in which the physical quantity detection device 1 is built in a printing apparatus and the detection object is ink 100. The ink 100 is not particularly limited. Examples of the ink 100 include cyan, magenta, black, clear, and a material containing a metal powder. A coloring material may be a dye or a pigment. The physical quantity detection device 1 can detect a remaining amount of the ink 100 regardless of a type of the coloring material.

First, the printing apparatus 10 is described before the physical quantity detection device 1 is described.

The printing apparatus 10 includes a storage unit 11 that stores a sheet S which is a printing sheet, an inkjet head 12 that ejects the ink 100 onto the sheet S supplied from the storage unit 11, the physical quantity detection device 1, and a display unit 13. The ink 100 is supplied from the physical quantity detection device 1 to the inkjet head 12.

As will be described later, the display unit 13 functions as a notification unit that notifies of a remaining amount of the ink 100 detected by the physical quantity detection device 1. The display unit 13 is a liquid crystal screen or the like. The notification unit is not limited to the display unit 13, and may make a notification by voice, vibration, or a lamp flashing pattern. The notification unit may be a device having a communication function, such as a PC screen or a smartphone.

As will be described later, a remaining amount of the ink 100 can be accurately detected and a user can accurately know the remaining amount of the ink 100 by incorporating the physical quantity detection device 1 in the printing apparatus 10.

Next, the physical quantity detection device 1 will be described.

As shown in FIGS. 2 to 6, the physical quantity detection device 1 includes a container 2, a first electrode 3, a second electrode 4, an electrostatic capacitance detector 5, and a control unit 6. The control unit 6 may also serve as a control unit that controls each unit of the printing apparatus 10.

The container 2 is internally formed with an accommodation space 20, and can accommodate the ink 100 serving as a detection object in the accommodation space 20. The container 2 has a bottomed cylindrical shape with the z axis direction as a depth direction. That is, as shown in FIG. 2, the container 2 includes a bottom plate 21 at a −z axis side and four side walls 22, 23, 24, and 25 that are erected and protrude from the bottom plate 21 toward a +z axis side. A space surrounded by the bottom plate 21 and the side walls 22 to 25 is the accommodation space 20.

Although not shown, the container 2 includes a top plate at an opposite side of the container 2 from the bottom plate 21, that is, at the +z axis side of the side walls 22 to 25. The top plate may be joined to the side walls 22 to 25, or may be freely attachable to and detachable from the side walls 22 to 25.

The bottom plate 21 is a plate member joined to the −z axis side of the side walls 22 to 25. The bottom plate 21 is formed with a discharge port 211 serving as a discharge portion configured by a through hole. Accordingly, the ink 100 in the accommodation space 20 can be discharged to the outside of the container 2. The discharge port 211 is coupled to the inkjet head 12 via a pipeline (not shown). The ink 100 discharged from the discharge port 211 is supplied to the inkjet head 12 shown in FIG. 1 via the pipeline, and is printed on the sheet S.

When the ink 100 is discharged from the discharge port 211, the ink 100 in the accommodation space 20 decreases so that a liquid level moves to the −z axis side while maintaining a state in which the liquid level is along a horizontal direction.

The ink 100 serving as a detection object is a liquid and has flowability. The container 2 is formed with the discharge port 211 serving as a discharge portion that discharges the ink 100 serving as a detection object. In this manner, it is required to know a remaining amount of the ink 100 in the container 2 when the ink 100 in the container 2 is discharged and gradually decreases. It is possible to prevent the ink 100 from running out at unintended timing by knowing the remaining amount.

The discharge port 211 may be formed in a part other than the bottom plate 21. For example, the discharge port 211 may be provided on any one of the side walls 22 to 25 at a part near the bottom plate 21. The present disclosure is not limited to a configuration formed with the discharge port 211. For example, the present disclosure may adopt a configuration in which a tube or the like is inserted into the accommodation space 20 from a part other than the bottom plate 21 and the ink 100 in the container 2 is suctioned. In this case, the tube functions as the discharge portion.

The side wall 22 is erected along the +z axis side from an edge portion at the −x axis side of the bottom plate 21. The side wall 22 has a plate shape whose thickness direction is the x axis direction. Three second electrodes 4A to 4C are provided on an outer surface side of the side wall 22, that is, on a surface side at the −x axis side.

The side wall 23 is erected along the +z axis side from an edge portion at the −y axis side of the bottom plate 21. The side wall 23 has a plate shape whose thickness direction is the y axis direction.

The side wall 24 is erected along the +z axis side from an edge portion at the +x axis side of the bottom plate 21. The side wall 24 has a plate shape whose thickness direction is the x axis direction. The first electrode 3 is provided on an outer surface side of the side wall 24, that is, on a side surface at the +x axis side.

The side wall 25 is erected along the +z axis side from an edge portion at the +y axis side of the bottom plate 21. The side wall 25 has a plate shape whose thickness direction is the y axis direction.

The side wall 22 and the side wall 24 are provided separately from each other and parallelly to face each other in the x axis direction. The side wall 22 and the side wall 24 have the same size and shape. The side wall 23 and the side wall 25 are provided separately from each other and parallelly to face each other in the y axis direction. The side wall 23 and the side wall 25 have the same size and shape. That is, an outer shape of the container 2 is a rectangular parallelepiped.

The side walls 22 to 25 are flat plates. Alternatively, at least a part of the side walls 22 to 25 may be curved or bent.

A length of the side wall 23 and the side wall 25 in the x axis direction, that is, a separation distance D to be described later between the first electrode 3 and the second electrode 4 is preferably smaller than a length y3 of the side wall 22 and the side wall 24 in the y axis direction. Accordingly, a maximum electrostatic capacitance of a first capacitor Ca to a third capacitor Cc to be described later can be sufficiently ensured and detection accuracy of a remaining amount of the ink 100 can be improved.

The separation distance D is preferably 5 mm or more and 100 mm or less, and more preferably 10 mm or more and 50 mm or less. Accordingly, an effect described above can be more reliably attained.

A constituent material of the container 2 is not particularly limited as long as the ink 100 does not permeate the container 2 and the container is formed of a dielectric. Examples of the constituent material of the container 2 include various resin materials such as polyolefin, polycarbonate, and polyester, and various glass materials. The container 2 may be formed of a hard material or a soft material. Alternatively, a part of the container 2 may be hard and the other part may be soft.

A relative dielectric constant of the constituent material of the container 2 is preferably 1 or more, and more preferably 2 or more, which has an advantage in detecting a remaining amount of the ink 100.

The first electrode 3 and at least one second electrode 4 are provided on an outer side of the container 2. As shown in FIGS. 2 and 3, the first electrode 3 and the second electrode 4 parallelly face each other in the x axis direction. As will be described in detail later, the first electrode 3 has an elongated shape extending in the z axis direction.

The second electrodes 4 are operated independently. It is preferable to provide a plurality of second electrodes 4 that are separated from one another along the z axis. Accordingly, a remaining amount of the ink 100 can be detected in a stepwise manner as will be described later.

Three second electrodes 4 are provided in the present embodiment. Hereinafter, the three second electrodes 4 are referred to as a second electrode 4A, a second electrode 4B, and a second electrode 4C. The second electrodes 4A to 4C are provided separately from one another along the z axis direction and are arranged in order from the +z axis side. The second electrodes 4A to 4C are provided in parallel to one another.

As shown in FIG. 3, when the first electrode 3 and the second electrodes 4A to 4C are projected in the x axis direction, that is, when viewed from the x axis direction, the first electrode 3 overlaps the second electrodes 4A to 4C in three regions. Hereinafter, a region where the first electrode 3 overlaps the second electrode 4A is referred to as an effective region 300A, a region where the first electrode 3 overlaps the second electrode 4B is referred to as an effective region 300B, and a region where the first electrode 3 overlaps the second electrode 4C is referred to as an effective region 300C. The effective regions 300A to 300C are separated from one another along the x axis direction and are arranged in order from the +z axis side.

A part corresponding to the effective region 300A of the first electrode 3 and the second electrode 4A, that is, a part where the effective region 300A of the first electrode 3 and the second electrode 4A is formed forms the first capacitor Ca in an equivalent circuit shown in FIG. 5. A part corresponding to the effective region 300B of the first electrode 3 and the second electrode 4B, that is, a part where the effective region 300B of the first electrode 3 and the second electrode 4B is formed forms the second capacitor Cb in the equivalent circuit shown in FIG. 5. A part corresponding to the effective region 300C of the first electrode 3 and the second electrode 4C, that is, a part where the effective region 300C of the first electrode 3 and the second electrode 4C is formed forms the third capacitor Cc in the equivalent circuit shown in FIG. 5. The first capacitor Ca to the third capacitor Cc are capacitors shown in the equivalent circuit shown in FIG. 5. The equivalent circuit will be described later.

First, a configuration of the first electrode 3 will be described.

The first electrode 3 is a transmitting electrode to which a voltage is applied from an alternating current power supply 8 to be described later. As shown in FIGS. 2 to 4, the first electrode 3 is provided on an outer side of the side wall 24, that is, on the +x axis side. The first electrode 3 is formed of a conductive material. For example, the first electrode 3 is formed of a metal material such as gold, silver, copper, aluminum, iron, nickel, and cobalt, and an alloy containing these metals. The first electrode 3 may be directly formed on an outer surface of the side wall 24 by plating, vapor deposition, printing, or the like, or may be bonded to the outer surface of the side wall 24 via an adhesive layer (not shown), or may be supported by a support member (not shown) in contact or non-contact with the side wall 24.

The first electrode 3 has an elongated shape extending in the z axis direction. As shown in FIG. 3, a width of the first electrode 3, that is, a length y1 in the y axis direction is constant along the z axis direction. The length y1 is not particularly limited. For example, the length y1 is preferably 2 mm or more and 100 mm or less, and more preferably 5 mm or more and 50 mm or less. Accordingly, sizes of the effective regions 300A to 300C can be sufficiently and easily ensured and detection accuracy of a remaining amount of the ink 100 can be improved.

A length of the first electrode 3, that is, a length z1 in the z axis direction is not particularly limited. For example, the length z1 is preferably 3 mm or more and 200 mm or less, and more preferably 5 mm or more and 100 mm or less. Accordingly, when viewed from the x axis direction, the first electrode 3 can more reliably overlap each of the second electrodes 4A to 4C. The effective regions 300A to 300C can have the same area.

When viewed from the x axis direction, an area S1 of a shape of the first electrode 3 in a plan view is preferably 6 mm$^2$ or more and 30,000 mm$^2$ or less, and more preferably 25 mm$^2$ or more and 10,000 mm$^2$ or less. Accordingly, sizes of the effective regions 300A to 300C can be sufficiently and easily ensured and detection accuracy of a remaining amount of the ink 100 can be improved.

An end portion at the −z axis side of the first electrode 3 is located at the −z axis side relative to a bottom surface 212 facing the accommodation space 20 of the container 2. If the end portion at the −z axis side of the first electrode 3 is located at the +z axis side relative to the bottom surface 212 facing the accommodation space 20 of the container 2, an area of the effective region 300C where the first electrode 3 overlaps the second electrode 4C may be reduced depending on a position of the second electrode 4C. In contrast, in the physical quantity detection device 1, an area of the effective region 300C can be ensured as large as possible with the above configuration. Therefore, detection accuracy of a remaining amount of the ink 100 can be improved.

In a configuration shown in the figure, an end portion at the +z axis side of the first electrode 3 is located at the −z axis side relative to an edge portion at the +z axis side of the side wall 24. However, the present disclosure is not limited thereto. A position of the end portion at the +z axis side of the first electrode 3 may coincide with that of the edge portion at the +z axis side of the side wall 24.

Although the first electrode 3 has an elongated shape extending in the z axis direction in the configuration shown in the figure, the present disclosure is not limited thereto. The first electrode 3 may have a shape in which a relationship of y1≥z1 is satisfied depending on a shape of the side wall 24. Parts of the first electrode 3 other than the parts where the effective regions 300A to 300C are formed may be divided.

Next, the second electrodes 4A to 4C will be described.

The second electrodes 4A to 4C are receiving electrodes, and are provided on an outer side surface of the side wall 22, that is, at the −x axis side. Each of the second electrodes 4A to 4C has an elongated shape extending in the y axis direction. The second electrodes 4A to 4C are separated from one another along the z axis direction and are arranged in order from the +z axis side. The second electrodes 4A to 4C are provided in parallel to one another.

As shown in FIGS. 2 to 4, the second electrodes 4A to 4C are provided at an outer side of the side wall 22, that is, at the −x axis side. The second electrodes 4A to 4C can be formed of a material the same as a material of the first electrode 3 using the same method.

Since the second electrodes 4A to 4C have the same shape, size, and interval, hereinafter, the second electrode 4A will be described as a representative. The present disclosure is not limited thereto. Alternatively, at least one of the shapes, sizes, and intervals of the second electrodes 4A to 4C may be different.

In the present disclosure, a length of the second electrode 4A, that is, a length y2 along the y axis direction, is larger than the length y1 of the first electrode 3 in the y axis direction as shown in FIG. 3. For example, the length y2 is preferably 3 mm or more and 110 mm or less, and more preferably 6 mm or more and 60 mm or less. Accordingly, sizes of the effective regions 300A to 300C can be sufficiently and easily ensured and detection accuracy of a remaining amount of the ink 100 can be improved.

In the present disclosure, a width of the second electrode 4A, that is, a length z2 along the z axis direction is smaller than the length z1 of the first electrode 3. For example, the length z2 is preferably 0.2 mm or more and 10 mm or less, and more preferably 0.5 mm or more and 5 mm or less. Accordingly, when viewed from the x axis direction, all of the second electrodes 4A to 4C can overlap the first electrode 3 to a maximum extent. The effective regions 300A to 300C can have the same area.

When viewed from the x axis direction, an area S2 of a shape of the second electrode 4A in a plan view is preferably 0.6 mm$^2$ or more and 1100 mm$^2$ or less, and more preferably 3 mm$^2$ or more and 300 mm$^2$ or less. Accordingly, sizes of the effective regions 300A to 300C can be sufficiently and easily ensured and detection accuracy of a remaining amount of the ink 100 can be improved.

In the configuration shown in the figure, an end portion at the +y axis side of the second electrode 4A coincides with an edge portion at the +y axis side of the side wall 22. The present disclosure is not limited thereto. Alternatively, the end portion at the +y axis side of the second electrode 4A may be located at the −y axis side relative to the edge portion at the +y axis side of the side wall 22.

In the configuration shown in the figure, an end portion at the −y axis side of the second electrode 4A coincides with an edge portion at the −y axis side of the side wall 22. The present disclosure is not limited thereto. Alternatively, the end portion at the −y axis side of the second electrode 4A may be located at the +y axis side relative to the edge portion at the −y axis side of the side wall 22.

As described above, when the x axis, the y axis, and the z axis along a vertical direction are set as three axes orthogonal to each other, a depth direction of the container 2 is the z axis direction. The second electrode 4 has an elongated shape extending along the y axis direction and is provided separately from the first electrode 3 in the x axis direction. Accordingly, a remaining amount of the ink 100 in the container 2 can be accurately detected regardless of arrangement accuracy of the first electrode 3 and the second electrode 4, which will be described later.

In the physical quantity detection device 1, one first electrode 3 also serves as an electrode plate of the first capacitor Ca, an electrode plate of the second capacitor Cb, and an electrode plate of the third capacitor Cc. Accordingly, when a voltage is applied to the first electrode 3, voltages applied to the first capacitor Ca, the second capacitor Cb, and the third capacitor Cc can be the same. Therefore, a variation in detection accuracy of electrostatic capacitances of the first capacitor Ca, the second capacitor Cb, and the third capacitor Cc can be prevented, and high detection accuracy can be achieved regardless of a remaining amount of the ink 100.

When two facing electrodes are slightly shifted, an area of an effective region is reduced in the electric capacitance detection unit disclosed in Patent Literature 1. When an effective area is reduced, detection accuracy of an electrostatic capacitance is reduced since a maximum electrostatic capacitance value of a capacitor decreases. Therefore, high positional accuracy of each electrode is required in order to attain high detection accuracy in the electric capacitance detection unit in Patent Literature 1. On the other hand, the physical quantity detection device 1 can prevent or reduce a reduction in detection accuracy of an electrostatic capacitance even when positions of electrodes are slightly shifted, which will be described later. Hereinafter, such a case will be described.

In the physical quantity detection device 1, relationships of y1<y2 and z1>z2 are satisfied in which y1 is a length of the first electrode 3 in the y axis direction, z1 is a length of the first electrode 3 in the z axis direction, y2 is a length of the second electrodes 4A to 4C along the y axis direction, and z2 is a length of the second electrodes 4A to 4C along the z axis direction as shown in FIG. 3. Accordingly, even when the first electrode 3 and the second electrodes 4A to 4C are relatively and slightly shifted in the +y axis direction, the −y axis direction, the +z axis direction, and the −z axis direction, areas of the effective regions 300A to 300C do not change. For example, even when an extending direction of the first electrode 3 is slightly inclined with respect to the z axis, as shown in FIG. 11, only shapes of the effective regions 300A to 300C are changed from a rectangle to a parallelogram, and areas of the effective regions 300A to 300C are not changed. In this manner, maximum electrostatic capacitances of the first capacitor Ca to the third capacitor Cc can be prevented from decreasing, and a reduction in detection accuracy of the electrostatic capacitances can be prevented or reduced. Accordingly, a remaining amount of the ink 100 in the container 2 can be accurately detected regardless of arrangement accuracy of the first electrode 3 and the second electrodes 4A to 4C.

Although not shown, when an extending direction of the second electrodes 4A to 4C is slightly inclined with respect to the y axis, similarly as described above, only shapes of the effective regions 300A to 300C are changed, and areas of the effective regions 300A to 300C are not changed. Therefore, the same effect as described above can be attained even when arrangement accuracy of the second electrodes 4A to 4C is poor.

As shown in FIG. 3, when viewed from the x axis direction, the first electrode 3 includes parts protruding toward the +z axis side and the −z axis side from the effective region 300A, parts protruding toward the +z axis side and the −z axis side from the effective region 300B, and parts protruding toward the +z axis side and the −z axis side from the effective region 300C. Accordingly, areas of the effective regions 300A to 300C can be more reliably prevented from changing even when arrangement accuracy of the first electrode 3 and the second electrodes 4A to 4C is low.

As described above, when regions where the first electrode 3 overlaps the second electrodes 4A to 4C as viewed from the x axis direction serve as the effective region 300A, the effective region 300B, and the effective region 300C, the first electrode 3 includes parts respectively protruding toward a positive side of the z axis direction and a negative side of the z axis direction from the effective regions 300A to 300C. Accordingly, areas of the effective regions 300A to 300C can be more reliably prevented from changing even when arrangement accuracy of the first electrode 3 or the second electrodes 4A to 4C is low.

As shown in FIG. 3, when viewed from the x axis direction, the second electrode 4A includes parts protruding toward the +y axis side and the −y axis side from the effective region 300A. When viewed from the x axis direction, the second electrode 4B includes parts protruding toward the +y axis side and the −y axis side from the effective region 300B. When viewed from the x axis direction, the second electrode 4C includes parts protruding toward the +y axis side and the −y axis side from the effective region 300C. Accordingly, areas of the effective regions 300A to 300C can be more reliably prevented from changing even when arrangement accuracy of the first electrode 3 and the second electrodes 4A to 4C is low.

As described above, when regions where the first electrode 3 overlaps the second electrodes 4A to 4C as viewed from the x axis direction serve as the effective region 300A, the effective region 300B, and the effective region 300C, the second electrodes 4A to 4C include parts respectively protruding toward a positive side of the y axis direction and a negative side of the y axis direction from the effective regions 300A to 300C. Accordingly, areas of the effective regions 300A to 300C can be more reliably prevented from changing even when arrangement accuracy of the first electrode 3 or the second electrodes 4A to 4C is low.

As shown in FIG. 3, the length z1 of the first electrode 3 is larger than a separation distance between a long side 41 at the +z axis side of the second electrode 4A and a long side 42 at the −z axis side of the second electrode 4C, that is, a maximum separation distance z3. That is, the length z1 of the first electrode 3 is larger than a maximum length of a region, in which the second electrodes 4A to 4C are formed, in the z axis direction.

As described above, a relationship of z1>z3 is satisfied in which z3 is the maximum separation distance along the z axis between the long side 41 at a vertically upper side of the second electrode 4A that is located uppermost in the vertical direction among the plurality of second electrodes 4 and the long side 42 at a vertically lower side of the second electrode 4C that is located lowermost in the vertical direction among the plurality of second electrodes 4. Accordingly, it is possible to more reliably implement a configuration in which the first electrode 3 includes parts respectively protruding toward the +z axis side and the −z axis side from the effective regions 300A to 300C when viewed from the x axis direction. Therefore, the effect described above can be more reliably attained.

It is preferable to satisfy a relationship of 0.03≤S0/S1≤0.7 and more preferable to satisfy a relationship of 0.05≤S0/S1≤0.6 in which S0 is a total area of the effective regions 300A to 300C and S1 is an area of the first electrode 3. Accordingly, sizes of the effective regions 300A to 300C can be sufficiently ensured and detection accuracy of the ink 100 can be improved.

It is preferable to satisfy a relationship of 0.1≤S0/S2≤0.6 and more preferable to satisfy a relationship of 0.2≤S0/S2≤0.5 in which S0 is the total area of the effective regions 300A to 300C and S2 is a total area of the second electrodes 4A to 4C. Accordingly, sizes of the effective regions 300A to 300C can be sufficiently ensured and detection accuracy of the ink 100 can be improved.

It is preferable to satisfy a relationship of 0≤D2/D1≤0.5 and more preferable to satisfy a relationship of 0≤D2/D1≤0.3 in which D1 is a maximum depth of the accommodation space 20 of the container 2 and D2 is a minimum separation distance between the second electrode 4C and the bottom surface 212 which is a bottom portion of the container 2 when viewed from the x axis direction. In this manner, a state in which a remaining amount of the ink 100 is 0 or close to 0 can be detected by localizing the second electrode 4C at a side close to the bottom surface 212 of the container 2.

Each of the first electrode 3 and the second electrodes 4A to 4C is covered with an insulation layer 7 as shown in FIG. 4. An outer side of the insulation layer 7 is further covered with a shield member 9. The first electrode 3 and the second electrodes 4A to 4C can be prevented from electrically interfering with other electronic circuits or other electronic components (not shown) by providing the shield member 9. Therefore, detection accuracy of a remaining amount of the ink 100 can be improved. The first electrode 3 and the second electrodes 4A to 4C can be prevented from being electrically coupled to the shield member 9 by providing the insulation layer 7.

A constituent material of the insulation layer 7 is not particularly limited. Examples of the constituent material of the insulation layer 7 include various rubber materials and various resin materials.

The shield member 9 is coupled to a reference potential, that is, a ground electrode. A constituent material of the shield member 9 may be the same as the above-described constituent materials of the first electrode 3 and the second electrodes 4A to 4C.

Next, a circuit diagram of a main part of the physical quantity detection device 1 will be described.

As shown in FIG. 5, the first electrodes 3 are coupled to the alternating current power supply 8 in parallel. Therefore, each of the first capacitor Ca, the second capacitor Cb, and the third capacitor Cc has equipotential at a first electrode 3 side. The second electrodes 4A, 4B, and 4C are coupled to the electrostatic capacitance detector 5 in parallel. The electrostatic capacitance detector 5 includes a mechanism for detecting a physical quantity related to a change in electrostatic capacitances of the first capacitor Ca to the third capacitor Cc. Examples of the detection mechanism include a self-capacitance type electrostatic capacitance detection circuit and a mutual capacitance type electrostatic capacitance detection circuit. Alternatively, the detection mechanism includes, for example, a voltage detection circuit that detects partial voltages between the first capacitor Ca to the third capacitor Cc and a circuit. The alternating current power supply 8 and the electrostatic capacitance detector 5 may be provided in the same chip. That is, the electrostatic capacitance detector 5 may include the alternating current power supply 8.

The first capacitor Ca, the second capacitor Cb, and the third capacitor Cc are coupled in parallel to one another, and the same voltage from the alternating current power supply 8 is applied to each of the first capacitor Ca, the second capacitor Cb, and the third capacitor Cc. A circuit of the main part of the physical quantity detection device 1 may be a mutual capacitance type circuit.

A first parasitic capacitor Ca' is a parasitic capacitance including the first electrode 3 or the second electrode 4A of the first capacitor Ca and, for example, the insulation layer 7 and the shield member 9 in a peripheral part of the first capacitor Ca. The first parasitic capacitor Ca' acts as a capacitor.

Similarly, a second parasitic capacitor Cb' is a parasitic capacitance including the first electrode 3 or the second electrode 4B of the second capacitor Cb and, for example, the insulation layer 7 and the shield member 9 in a peripheral part of the second capacitor Cb. The second parasitic capacitor Cb' acts as a capacitor.

Similarly, a third parasitic capacitor Cc' is a parasitic capacitance including the first electrode 3 or the second electrode 4C of the third capacitor Cc and, for example, the insulation layer 7 and the shield member 9 in a peripheral part of the third capacitor Cc. The third parasitic capacitor Cc' acts as a capacitor.

The first parasitic capacitor Ca' is coupled in series to the first capacitor Ca in an equivalent circuit. The second parasitic capacitor Cb' is coupled in series to the second capacitor Cb in the equivalent circuit. The third parasitic capacitor Cc' is coupled in series to the third capacitor Cc in the equivalent circuit.

Electrostatic capacitances of the first parasitic capacitor Ca' to the third parasitic capacitor Cc' are sufficiently larger than electrostatic capacitances of the first capacitor Ca to the third capacitor Cc. Therefore, the circuit is required to have a configuration in which the electrostatic capacitances of the first parasitic capacitor Ca' to the third parasitic capacitor Cc' are not detected when the electrostatic capacitances of the first capacitor Ca to the third capacitor Cc are detected.

In the present embodiment, the electrostatic capacitance detector 5 is coupled to a part between the first capacitor Ca and the first parasitic capacitor Ca', a part between the second capacitor Cb and the second parasitic capacitor Cb', and a part between the third capacitor Cc and the third parasitic capacitor Cc'. Therefore, the electrostatic capacitance detector 5 can reduce an influence from the electrostatic capacitances of the first parasitic capacitor Ca' to the third parasitic capacitor Cc' as much as possible and detect the electrostatic capacitances of the first capacitor Ca to the third capacitor Cc.

The electrostatic capacitance detector 5 detects a voltage between the first electrode 3 and the second electrode 4 as information on an electrostatic capacitance between the first electrode 3 and the second electrode 4. Specifically, the electrostatic capacitance detector 5 separately detects voltages of the first capacitor Ca to the third capacitor Cc. Although not shown, a circuit including a detection capacitor, a resistor, or the like can be used as the electrostatic capacitance detector 5. When the alternating current power supply 8 applies an alternating current voltage to the first capacitor Ca to the third capacitor Cc, voltage waveforms change in accordance with electrostatic capacitance values of the first capacitor Ca to the third capacitor Cc. The electrostatic capacitance detector 5 detects voltages of a coupled part over time. Then, the electrostatic capacitance detector 5 outputs voltage information to the control unit 6.

FIGS. 7 to 10 are graphs showing examples of voltage information output by the electrostatic capacitance detector 5. In FIGS. 7 to 10, constant voltages that are different from each other are displayed in a state of superimposing on detected voltages of the first capacitor Ca to the third capacitor Cc in order to display voltage waveforms of the first capacitor Ca to the third capacitor Cc in the same graph. Therefore, the voltage waveforms of the first capacitor Ca to the third capacitor Cc are shifted and displayed in the vertical direction in FIGS. 7 to 10.

For example, electrostatic capacitances are different when the ink 100 is present between the first electrode 3 and the second electrode 4A, that is, in the first capacitor Ca and when air is present between the first electrode 3 and the second electrode 4A. The same applies to the second capacitor Cb and the third capacitor Cc. The control unit 6 to be described later detects a remaining amount of the ink 100 based on a difference in the electrostatic capacitances.

Figure 7:
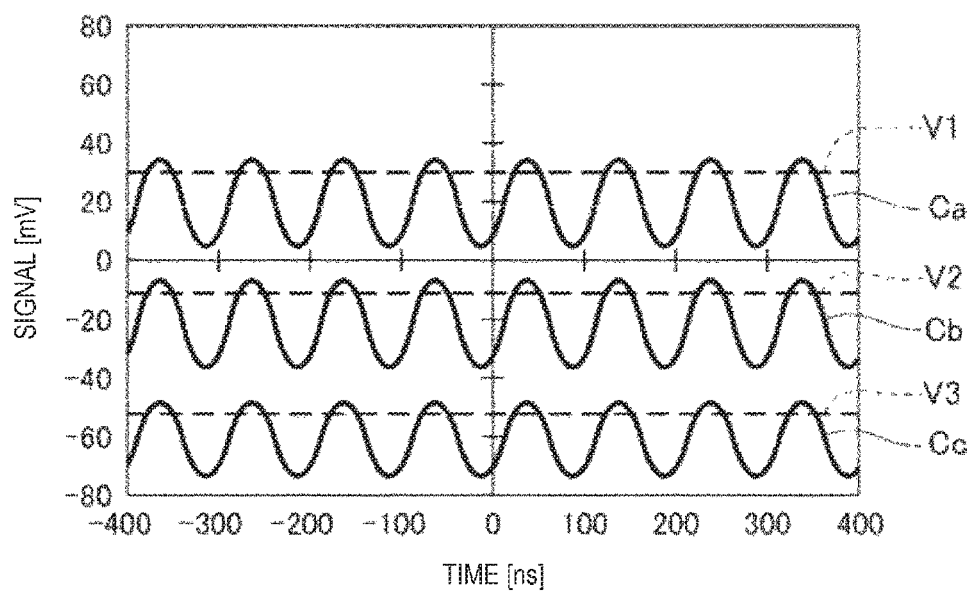
FIG. 7 is a graph showing a temporal change of voltages detected by the electrostatic capacitance detector.

Specifically, when a liquid level of the ink 100 is at a position P1 shown in FIG. 4, that is, when the ink 100 is present in all of the first capacitor Ca, the second capacitor Cb, and the third capacitor Cc at full capacity, voltage waveforms of the first capacitor Ca, the second capacitor Cb, and the third capacitor Cc, each having a predetermined amplitude, are detected as shown in FIG. 7.

Figure 8:
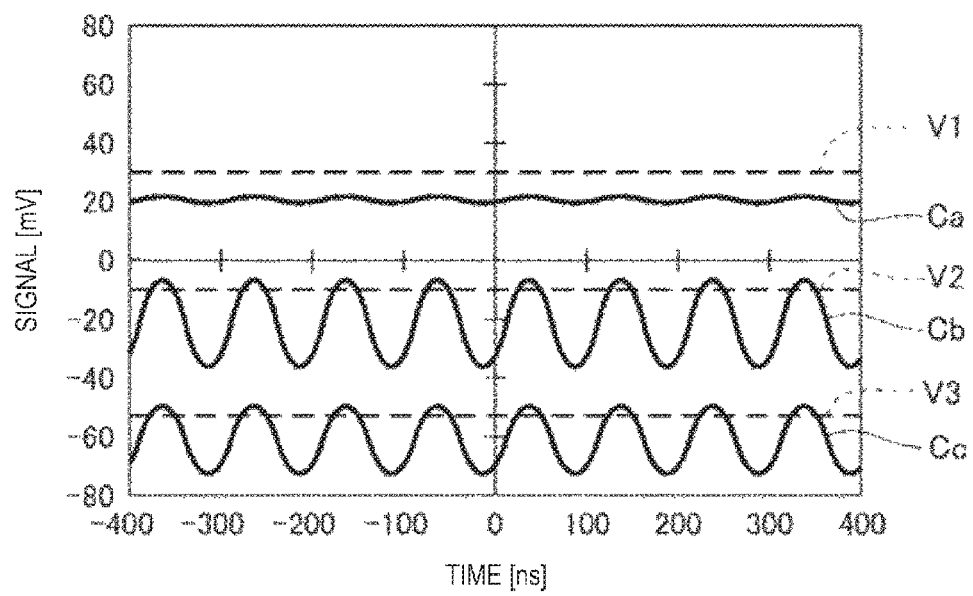
FIG. 8 is a graph showing a temporal change of voltages detected by the electrostatic capacitance detector.

When the ink 100 in the container 2 decreases and a liquid level of the ink 100 is at a position P2 shown in FIG. 4, that is, when air instead of the ink 100 is present in the first capacitor Ca, an electrostatic capacitance of the first capacitor Ca is reduced as compared with the above-described case since a dielectric in the first capacitor Ca, that is, the ink 100, is replaced with air. Therefore, an amplitude of a voltage waveform of the first capacitor Ca is reduced as shown in FIG. 8. Since the ink 100 is present in the second capacitor Cb and the third capacitor Cc at full capacity, voltage waveforms of the second capacitor Cb and the third capacitor Cc remain the same as the voltage waveforms shown in FIG. 7.

Figure 9:
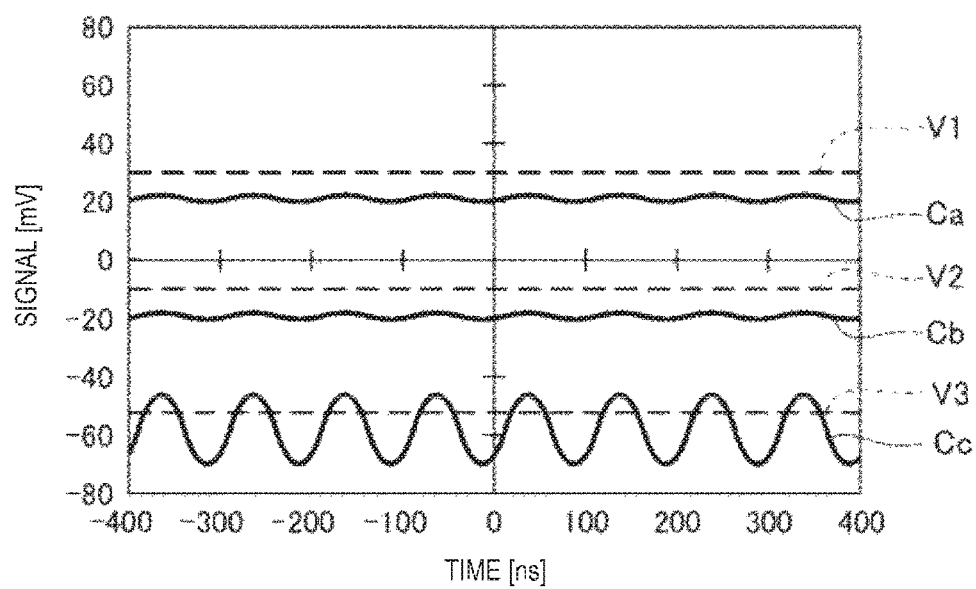
FIG. 9 is a graph showing a temporal change of voltages detected by the electrostatic capacitance detector.

When the ink 100 in the container 2 further decreases and a liquid level of the ink 100 is at a position P3 shown in FIG. 4, that is, when air is present in the first capacitor Ca and the second capacitor Cb, an amplitude of a voltage waveform of the second capacitor Cb is also reduced as shown in FIG. 9 according to the same principle as described above.

Figure 10:
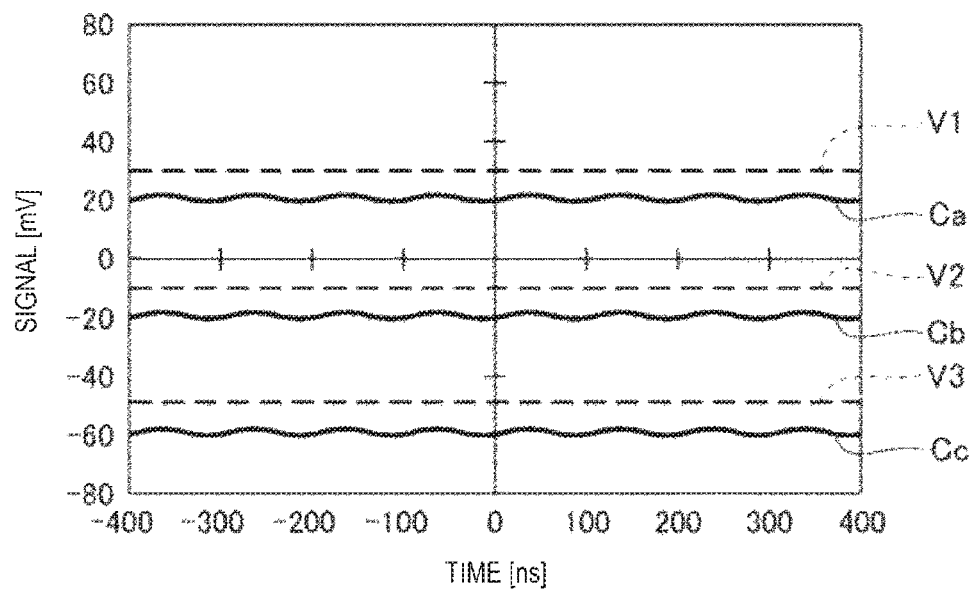
FIG. 10 is a graph showing a temporal change of voltages detected by the electrostatic capacitance detector.

When the ink 100 further decreases and all of the ink 100 in the container 2 runs out, an amplitude of a voltage waveform of the third capacitor Cc is also reduced as shown in FIG. 10 according to the same principle as described above.

In this manner, electrostatic capacitances of the first capacitor Ca to the third capacitor Cc change in accordance with a remaining amount of the ink 100, that is, in accordance with a position of a liquid level of the ink 100. Then, information on voltages corresponding to the electrostatic capacitances is transmitted to the control unit 6.

As shown in FIG. 6, the control unit 6 includes a central processing unit (CPU) 61 as a processor and a storage unit 62.

The CPU 61 reads and executes various programs and the like stored in the storage unit 62. The storage unit 62 stores various programs and the like that can be executed by the CPU 61. Examples of the storage unit 62 include a volatile memory such as a random access memory (RAM), a non-volatile memory such as a read only memory (ROM), and an attachable and detachable external storage device.

The storage unit 62 stores a first reference value V1, a second reference value V2, and a third reference value V3 as shown in FIGS. 7 to 10. The first reference value V1 to the third reference value V3 are preset voltage values. In the present embodiment, the first reference value V1 to the third reference value V3 are different from one another. This is because constant voltages different from each other superimpose on detected voltages of the first capacitor Ca to the third capacitor Cc as described above. When constant voltages different from each other do not superimpose on detected voltages of the first capacitor Ca to the third capacitor Cc, the preset reference values may be the same.

The CPU 61 detects, that is, obtains information on a remaining amount of the ink 100 based on a detection result of the electrostatic capacitance detector 5, that is, voltage values transmitted from the electrostatic capacitance detector 5, and the first reference value V1 to the third reference value V3. Specifically, the CPU 61 determines whether an amplitude of the voltage waveform of the first capacitor Ca is reduced and whether a maximum value of voltages is equal to or smaller than the first reference value V1. The CPU 61 determines whether an amplitude of the voltage waveform of the second capacitor Cb is reduced and whether a maximum value of voltages is equal to or smaller than the second reference value V2. The CPU 61 determines whether an amplitude of the voltage waveform of the third capacitor Cc is reduced and whether a maximum value of voltages is equal to or smaller than the third reference value V3. Then, when a detected voltage is equal to or smaller than a reference value, it is regarded that no ink 100 is present in a corresponding capacitor.

A determination is performed in such a manner, so that information on a remaining amount of the ink 100 in the container 2 can be obtained based on a detection result of the electrostatic capacitance detector 5, that is, voltages corresponding to electrostatic capacitances.

As described above, the physical quantity detection device 1 includes the control unit 6 that obtains information on a remaining amount of the ink 100 serving as a detection object in the container 2 based on a detection result of the electrostatic capacitance detector 5. Accordingly, information on a remaining amount of the ink 100 can be obtained in a simple method in which the information on the remaining amount of the ink 100 is obtained based on a detection result of the electrostatic capacitance detector 5.

Examples of the information on a remaining amount of the ink 100 include information of digitalizing a remaining amount of the ink 100 in a stepwise manner, such as "0%", "30%", "60%", and "100%", and letters or symbols ranked according to a remaining amount of the ink 100, such as "A", "B", "C", and "D". Hereinafter, such pieces of information are collectively and simply referred to as a "remaining amount of the ink 100".

Such information is displayed on the display unit 13 described above. Accordingly, a user can know a remaining amount of the ink 100.

FIG. 16 shows a graph in which a frequency of an alternating current voltage applied to the first electrode 3 and the second electrode 4 serves as a horizontal axis, and a strength of a voltage detected by the electrostatic capacitance detector 5, that is, a maximum value of a voltage waveform serves as a vertical axis. The graph shows a result of a case in which tap water serves as a detection object and a result of a case in which ink ("MKA-BK" manufactured by Seiko Epson Corporation) containing a pigment serves as a detection object. When a frequency is 1 kHz or higher when a detection object is tap water and when a detection object is ink containing a pigment, maximum values in voltage waveforms can be increased. Accordingly, the values can be increased to be larger than the first reference value V1 to the third reference value V3. As a result, an erroneous detection described above can be avoided or prevented. Therefore, in the present disclosure, a frequency of an alternating current voltage applied to the first electrode 3 and the second electrode 4 is 1 kHz or higher. That is, a minimum frequency is 1 kHz or higher.

As shown in FIG. 14, when a liquid level of the ink 100 is lowered, the ink 100 may adhere to a position of an inner surface of the container 2 which is higher than the liquid level of the ink 100 due to wettability of the ink 100 on the inner surface of the container 2. That is, as shown in FIG. 14, the liquid level may form a meniscus, or liquid droplets may remain in a state of adhering to the inner surface of the container 2. Although various factors may be considered, mainly a type and composition of the ink 100 are considered to have a great influence.

In particular, when a remaining amount of the ink 100 is detected using an optical sensor, an erroneous detection may occur when the ink 100 adheres to the inner surface of the container 2.

The ink 100 adhering to the inner surface of the container 2 may sag downward from the inner surface of the container 2 and reaches the liquid level of the ink 100 over time. When a majority of the ink 100 adhering to the inner surface of the container 2 reaches the liquid level of the ink 100, it is approximate to an ideal state described above, and a remaining amount of the ink 100 can be accurately detected. However, as a period when a majority of the ink adhering to the inner surface of the container reaches the liquid level of the ink 100 is long, a period during which a remaining amount of the ink 100 cannot be accurately detected is long. That is, a period during which an erroneous detection may occur is long.

In order to prevent the ink 100 from adhering to the inner surface of the container 2, it is considered to perform a chemical water repellent treatment on the inner surface of the container 2. However, if a water repellent treatment is performed, a water repellent component may elute in the ink 100, which may have a bad influence on the ink 100.

In view of such a problem, an inventor of the present disclosure has found that the above problem is solved and the disclosure is implemented by setting a frequency of an alternating current voltage applied between the first electrode 3 and the second electrode 4 as follows.

A detection object is not limited to the ink 100. It is confirmed that an effect of the present disclosure is attained even when the detection object is a substance described above.

A case in which a liquid level of the ink 100 is at the position P2 shown in FIG. 4 will be described as an example. In this case, an ideal state is that no ink 100 is present between the first electrode 3 and the second electrode 4A, and a maximum voltage value of a voltage waveform of the first capacitor Ca including the first electrode 3 and the second electrode 4A is equal to or smaller than the first reference value V1 as indicated by a solid line in FIG. 15. However, when the inventor of the present specification creates an actual object and perform a verification experiment, it is found that, if the ink 100 adheres to a part between the first electrode 3 and the second electrode 4A on inner surfaces of the side wall 22 and the side wall 24, as indicated by a dashed-two dotted line in FIG. 15, there is a combination in which a maximum voltage value of a voltage waveform of the first capacitor Ca is larger than the first reference value V1 due to a combination of a frequency of an applied voltage and ink. In this case, although a liquid level of the ink 100 is at the position P2 in FIG. 4, the liquid level of the ink 100 may be determined at the position P1, that is, an erroneous detection may occur depending on a set value of the first reference value V1 or the like.

When a detection object is tap water, a change in signals converges within 10 seconds regardless of a frequency. Setting time within 10 seconds is due to experimental constraints on liquid discharge and it is found that a signal change is faster. Therefore, a frequency is preferably 1 kHz or higher based on a signal intensity.

On the other hand, when a detection object is pigment ink (MKA-BK), a signal intensity decreases after 5 minutes at 1 kHz while a signal intensity is already at a lower limit at 1 MHz after 10 seconds as shown in FIG. 17. As described above, speeds of removing ink from a side wall are different depending on a type of the ink. When MKA-BK is used, almost no ink is removed at 10 seconds and a majority of ink still remains even after 5 minutes. On such a basis, it is apparent that, at 10 kHz, a signal is not reduced due to an influence of ink that is not removed, while at 1 MHz, a signal is not influenced by ink removal.

It is considered that a reason why influences of ink removal are different depending on a frequency is that responsive polarization components are different. It is known that a dielectric response in a liquid depends on a type of ions or charged particles and a solvent, and space charge polarization is dominant at a low frequency of approximately 100 Hz or lower, ionic conduction is dominant at a frequency in a vicinity of 1 kHz, and orientation polarization is dominant at a frequency of 100 kHz or higher.

For the MKA-BK described above, since ionic conduction is dominant at 1 kHz, it is considered that an influence of remaining ink is large. In contrast, since ionic conduction cannot be followed at 1 MHz, it is considered that there is no influence. On the other hand, since a removal speed is fast for tap water and tap water is sufficiently removed within 10 seconds, it is considered that there is no influence.

Based on the above-described results, as a result of the inventor's dedicated evaluation of a large number of ink types, a frequency is desirably 1 kHz or higher if a detection object is water containing a type of ions like tap water, a frequency is desirably 10 kHz or higher if a detection object is dye ink, and a frequency is desirably 100 kHz or higher if a detection object is pigment ink.

An upper limit of a frequency of an alternating current voltage is not particularly limited, and is preferably 20 MHz or lower, and more preferably 18 MHz or lower. Even when a frequency exceeds the upper limit, an effect described above cannot be further improved.

The alternating current power supply 8 may have a configuration capable of changing a frequency of an alternating current voltage applied between the first electrode 3 and the second electrode 4. That is, a frequency may not always be equal to or higher than a minimum frequency described above during detection of a remaining amount of the ink 100. In such a case, a period of time when a frequency is equal to or higher than the minimum frequency described above is preferably 50% or more of total detection time, and more preferably 70% or more of total detection time. Accordingly, power consumption can be reduced and an effect of the present disclosure can be attained.

When the alternating current power supply 8 has a configuration capable of changing a frequency of an alternating current voltage applied between the first electrode 3 and the second electrode 4, a period of time during which a frequency is 10 kHz or higher is preferably 60% or more of total detection time, and more preferably 80% or more of total detection time. Accordingly, even when a detection object is the ink 100 containing a dye, power consumption can be reduced and an effect of the present disclosure can be attained.

When the alternating current power supply 8 has a configuration capable of changing a frequency of an alternating current voltage applied between the first electrode 3 and the second electrode 4, a period of time during which a frequency is 100 kHz or higher is preferably 70% or more of total detection time, and more preferably 90% or more of total detection time. Accordingly, even when a detection object is the ink 100 mainly containing a pigment, power consumption can be reduced and an effect of the present disclosure can be attained.

As described above, the physical quantity detection device 1 according to the present disclosure includes the container that is internally formed with the accommodation space 20 accommodating a detection object formed of a dielectric, the first electrode 3 and at least one second electrode 4 that are provided to face each other via the accommodation space 20, and the electrostatic capacitance detector 5 that applied an alternating current voltage between the first electrode 3 and the second electrode 4 and detects an electrostatic capacitance between the first electrode 3 and the second electrode 4. A frequency of the alternating current voltage applied between the first electrode 3 and the second electrode 4 is 1 kHz or higher. Accordingly, even when, for example, the ink 100 adheres to an inner surface of the container 2, a remaining amount of the ink 100 can be accurately and quickly detected regardless of a type of a detection object.

The printing apparatus 10 according to the present disclosure includes the physical quantity detection device 1 according to the present disclosure. Accordingly, the printing apparatus 10 can perform printing while taking advantage of the physical quantity detection device 1 described above. In particular, since a remaining amount of the ink 100 can be accurately detected, printing can be prevented from being stopped at unintended timing by appropriately replenishing the ink 100 when, for example, a remaining amount of the ink 100 decreases. When a plurality of second electrodes 4 are provided, a degree of a decrease of the ink 100 can be known in a stepwise manner and replenishment timing of the ink 100 can be well predicted.

Next, a control operation (a detection method) performed by the control unit 6 will be described with reference to a flowchart shown in FIG. 12.

First, a frequency of an alternating current voltage applied between the first electrode 3 and the second electrode 4 is set in step S100. The frequency is set based on, for example, a detection result of a type of the ink 100 and a table indicating a relationship between the type of the ink 100 and a frequency. Examples of a method for detecting a type of the ink 100 include a method of detecting information attached to the container 2. A user may input a type of the ink 100 instead of detecting a type of the ink 100.

In step S100, a frequency is set to 1 kHz or higher. As described above, a frequency is set to 10 kHz or higher when the ink 100 mainly contains a dye, a frequency is set to 100 kHz or higher when the ink 100 mainly contains a pigment, and the like.

Step S100 is a step for setting a frequency. Step S100 may be omitted and a voltage having a predetermined frequency may be applied in subsequent steps.

Next, in step S101, a remaining amount of the ink 100 is started to be detected. That is, voltages corresponding to electrostatic capacitances of the first capacitor Ca to the third capacitor Cc are separately detected by applying a voltage to the first capacitor Ca to the third capacitor Cc shown in FIG. 5.

Then, in step S102, it is determined whether a maximum value (hereinafter, simply referred to as a "voltage") of a voltage of the first capacitor Ca is equal to or smaller than the first reference value V1. For example, when a liquid level of the ink 100 is at the position P1 as shown in FIG. 4, a dielectric in the first capacitor Ca is the ink 100, and an amplitude of voltages of the first capacitor Ca does not change as shown in FIG. 7. In this case, it is determined in step S102 that a voltage of the first capacitor Ca is not equal to or smaller than the first reference value V1. A remaining amount is displayed in step S103. That is, the display unit 13 displays that a liquid level of the ink 100 is above the first capacitor Ca.

As described above, examples of a display method include information of digitalizing a remaining amount of the ink 100 in a stepwise manner, such as "0%", "30%", "60%", and "100%" and letters or symbols ranked according to a remaining amount of the ink 100, such as "A", "B", "C", and "D". For example, "100%" or "A" is displayed in step S103.

When it is determined in step S102 that a voltage of the first capacitor Ca is equal to or smaller than the first reference value V1, the control operation proceeds to step S104. For example, when a liquid level of the ink 100 is at the position P2 shown in FIG. 4, a dielectric in the first capacitor Ca is air, and an amplitude of voltages of the first capacitor Ca decreases as shown in FIG. 8. In this case, it is determined that a voltage of the first capacitor Ca is equal to or smaller than the first reference value V1.

In step S104, it is determined whether a voltage of the second capacitor Cb is equal to or smaller than the second reference value V2. When a liquid level of the ink 100 is at the position P2 shown in FIG. 4, a dielectric in the second capacitor Cb is the ink 100, and an amplitude of voltages of the second capacitor Cb does not change as shown in FIG. 8. In this case, it is determined in step S104 that a voltage of the second capacitor Cb is larger than the second reference value V2, and a remaining amount is displayed in step S105. That is, the display unit 13 displays that a liquid level of the ink 100 is between the first capacitor Ca and the second capacitor Cb. For example, "60%" or "B" is displayed in step S105.

When it is determined in step S104 that a voltage of the second capacitor Cb is equal to or smaller than the second reference value V2, the control operation proceeds to step S106. For example, when a liquid level of the ink 100 is at the position P3 shown in FIG. 4, a dielectric in the second capacitor Cb is air, and an amplitude of voltages of the second capacitor Cb decreases as shown in FIG. 9. In this case, it is determined that a voltage of the second capacitor Cb is equal to or smaller than the second reference value V2.

In step S106, it is determined whether a voltage of the third capacitor Cc is equal to or smaller than the third reference value V3. When a liquid level of the ink 100 is at the position P3 shown in FIG. 4, a dielectric in the third capacitor Cc is the ink 100, and an amplitude of voltages of the third capacitor Cc does not change as shown in FIG. 9. In this case, it is determined in step S106 that a voltage of the third capacitor Cc is larger than the third reference value V3, and a remaining amount is displayed in step S107. That is, the display unit 13 displays that a liquid level of the ink 100 is between the second capacitor Cb and the third capacitor Cc. For example, "30%" or "C" is displayed in step S107.

When it is determined in step S106 that a voltage of the third capacitor Cc is equal to or smaller than the third reference value V3, the display unit 13 displays that a remaining amount of the ink 100 is 0 in step S108. For example, "0%" or "D" is displayed in step S108.

For example, when a remaining amount of the ink 100 is 0, a dielectric in the third capacitor Cc is air, and an amplitude of voltages of the third capacitor Cc decreases as shown in FIG. 10. In this case, it is determined that a voltage of the third capacitor Cc is equal to or smaller than the third reference value V3.

In step S109, it is determined whether an ending instruction is issued. A determination in step S109 is made, for example, based on whether a user of the printing apparatus 10 turns off a power supply. When it is determined that an ending instruction is issued in step S109, the control operation is ended. When it is determined that an ending instruction is not issued in step S109, the control operation returns to step S108 and the display unit 13 displays that a remaining amount of the ink 100 is 0.

A remaining amount of the ink 100 can be accurately detected by performing steps described above. A control operation as shown in FIG. 13 may be performed. Hereinafter, only differences from the control operation shown in FIG. 12 will be described.

As described above, according to a type of a detection object, the detection method includes a frequency setting step for setting a frequency of an alternating current voltage applied between the first electrode 3 and the second electrode 4, and a detection step (steps S101 to S109) for detecting an electrostatic capacitance between the first electrode 3 and the second electrode 4 by applying, between the first electrode 3 and the second electrode 4, an alternating current voltage having a frequency set in the frequency setting step. Accordingly, an optimum frequency can be set according to a type of a detection object. Therefore, a remaining amount of the detection object can be accurately detected regardless of a type of the detection object.

In the control operation shown in FIG. 13, the control operation is returned to step S102 after step S103, returned to step 102 after step S105, returned to step S102 after step S107, and returned to step S102 when it is determined NO in step S109. That is, when a remaining amount of the ink 100 is detected, voltages of all of the first capacitors Ca to the third capacitors Cc are detected regardless of the remaining amount of the ink 100. According to such a configuration, even when the ink 100 is replenished in the middle of the control operation, an amount of the ink 100 after replenishment can be accurately detected.

Although the physical quantity detection device and the printing apparatus according to the present disclosure have been described above based on the embodiment with reference to the drawings, the present disclosure is not limited thereto. A configuration of each unit may be replaced with any configuration having the same function. Any other component may be added to the present disclosure.

An analog circuit that transmits an analog signal to the control unit 6 based on a voltage detected by the electrostatic capacitance detector 5 may be provided between the electrostatic capacitance detector 5 and the control unit 6 in the circuit diagram. A remaining amount of a detection object can be detected even in such a case.

The container may be attachable to and detachable from the printing apparatus, or may be fixed on the printing apparatus. When the container is attachable to and detachable from the printing apparatus, the container may be replaced with a new container when ink runs out, or may be repeatedly used by replenishing ink. When the container is fixed on the printing apparatus, ink is replenished when a remaining amount of the ink decreases.

Although the physical quantity detection device is applied to an ink tank of the printing apparatus in the embodiment described above, the present disclosure is not limited thereto. The physical quantity detection device can be suitably applied to detect a remaining amount of a dielectric material in a tank whose internal capacity changes. Examples of other embodiments include a modeling material tank of a 3D printer or an injection molding machine, a water heater, a beverage tank, a medical tank for infusion, insulin, and the like, and a refrigerant tank for cooling. The present disclosure is not limited to a liquid tank, and can also be applied to detect a remaining amount of a solid for a paper feed stocker, a paper discharge stocker, or the like.

What is claimed is:

1. An object quantity detection device comprising:
a container that has a first wall and a second wall, wherein an object is accommodated between the first wall and the second wall;
a first electrode and a second electrode that are provided on the first wall;
a third electrode that are provided on the second wall; and
an electrostatic capacitance detector that detects an electrostatic capacitance between the first electrode and the third electrode by applying an alternating current voltage between the first electrode and the third electrode and that detects an electrostatic capacitance between the second electrode and the third electrode by applying an alternating current voltage between the second electrode and the third electrode, wherein a frequency of the alternating current voltage is 1 kHz or higher.

2. The object quantity detection device according to claim 1, wherein
the object has flowability, and
the container further includes a discharge portion that discharges the object.

3. The object quantity detection device according to claim 2, wherein
the object is a liquid containing a dye, and
a frequency of the alternating current voltage applied between the first electrode and the second electrode is 10 kHz or higher.

4. The object quantity detection device according to claim 2, wherein
the object is a liquid containing a pigment, and
a frequency of the alternating current voltage applied between the first electrode and the second electrode is 100 kHz or higher.

5. The object quantity detection device according to claim 1, wherein
when an x axis, a y axis, and a z axis along a vertical direction are set as axes orthogonal to one another, a depth direction of the container is a direction of the z axis, and
each of the first wall and the second wall extends along z-y plains, and the second electrode is provided separately from the first electrode in a direction of the x axis.

6. The object quantity detection device according to claim 5, wherein
both the first electrode and the second electrode are opposite to the third electrode in the x axis.

7. The object quantity detection device according to claim 1, further comprising: a processor that obtains information on a remaining amount of the object in the container based on a detection result of the electrostatic capacitance detector.

8. A printing apparatus comprising:
the object quantity detection device according to claim 1.

9. A printing apparatus comprising:
the object quantity detection device according to claim 2.

10. A printing apparatus comprising:
the object quantity detection device according to claim 3.

11. A printing apparatus comprising:
the object quantity detection device according to claim 4.

12. A printing apparatus comprising:
the object quantity detection device according to claim 5.

13. A printing apparatus comprising:
the object quantity detection device according to claim 6.

14. A printing apparatus comprising:
the object quantity detection device according to claim 7.

* * * * *